(12) United States Patent
Nakamura et al.

(10) Patent No.: US 8,822,943 B2
(45) Date of Patent: Sep. 2, 2014

(54) NEUTRON DETECTOR AND NEUTRON IMAGE DETECTOR WITH SCINTILLATOR

(71) Applicants: Japan Atomic Energy Agency, Tokai-mura (JP); Hoshin Electronics Co., Ltd., Kawasaki (JP); Chichibu Fuji Co., Ltd., Saitama (JP)

(72) Inventors: Tatsuya Nakamura, Naka (JP); Masaki Katagiri, Naka (JP); Masumi Ebine, Naka (JP); Atsushi Birumachi, Naka (JP); Akira Ohzu, Naka (JP); Yutaka Yoribayashi, Kawasaki (JP); Noriaki Tsutsui, Oganao (JP)

(73) Assignees: Japan Atomic Energy Agency, Ibaraki (JP); Horshin Electronics Co., Ltd., Kawasaki-shi (JP); Chichibu Fuji Co., Ltd., Saitama (JP)

( * ) Notice: Subject to any disclaimer, the term of this patent is extended or adjusted under 35 U.S.C. 154(b) by 0 days.

(21) Appl. No.: 13/943,324

(22) Filed: Jul. 16, 2013

(65) Prior Publication Data

US 2014/0021359 A1    Jan. 23, 2014

(30) Foreign Application Priority Data

Jul. 17, 2012 (JP) .................................. 2012-158333

(51) Int. Cl.
G01T 3/06    (2006.01)
(52) U.S. Cl.
CPC ........................................ G01T 3/06 (2013.01)
USPC .................................................... 250/390.11
(58) Field of Classification Search
CPC ................ G01T 3/00; G01T 3/06; G01T 3/08
USPC ................................ 250/390.01, 390.11, 391
See application file for complete search history.

(56) References Cited

U.S. PATENT DOCUMENTS

2006/0076497 A1*  4/2006 Yamada et al. ............... 250/367
2010/0308225 A1* 12/2010 Nakamura ................. 250/361 R

OTHER PUBLICATIONS

E. H. Berkowitz, "A Position Sensitive Neutron Detector", Nuclear Instruments and Methods, 1969, vol. 73, North-Holland Publishing Co., pp. 225-227.
P. Netter et al., "A Large Position-Sensitive Neutron Detector", Nuclear Instruments and Methods, 1981, vol. 185, North-Holland Publishing Company, pp. 165-174.
R. Madey et al., "Large Volume Neutron Detectors with Subnanosecond Time Dispersions", Nuclear Instruments and Methods, 1983, vol. 214, North-Holland Publishing Company, pp. 401-413.

(Continued)

*Primary Examiner* — Mark R Gaworecki
(74) *Attorney, Agent, or Firm* — Crowell & Moring LLP

(57) ABSTRACT

A neutron detector without $^3$He gas, provided with a translucent type plate neutron scintillator having the structure capable to emit fluorescence from double-sides; the neutron scintillator is composed of ZnS fluorescent substance and a neutron converter which contains $^6$Li or $^{10}$B, and arranged at an angle of 45 degrees from the neutrons which are incident in parallel all together, inside of a cylindrical detector housing with the circular or square section where the specular reflector with the reflectance of 90% or more is arranged internally, and
the fluorescence emitted when the neutron enters the scintillator is detected by two photo multipliers arranged on both sides, and signals output from these two photo multipliers are processed to be taken out as a neutron signal.

18 Claims, 28 Drawing Sheets

(56) References Cited

OTHER PUBLICATIONS

S. Matsuyama et al., "Developments of a Long Liquid Scintillation Detector for Fast Neutron Time-of-Flight Experiments", Nuclear Instruments and Methods in Physics Research, 1996, vol. 372, pp. 246-252.

A. V. Kuznetsov et al., "Position-Sensitive Neutron Detector", Nuclear Instruments and Methods in Physics Research, 2002, vol. 477, pp. 372-377.

* cited by examiner ized signal when it is necessary to measure the neutron emitted from the irradiated nuclear fuel in the ultra-high gamma-ray background though the gamma ray
NEUTRON DETECTOR AND NEUTRON IMAGE DETECTOR WITH SCINTILLATOR

BACKGROUND OF THE INVENTION

The present invention relates to a specified neutron detector with a scintillator, and a one-dimensional or a two-dimensional neutron image detector which uses the neutron detector.

As the neutron detector which does not need the position information, $^3$He gas proportional counter has been chiefly used so far. The reason is that the structure is simple, the neutron detection efficiency is high, and the background of gamma ray sensitivity is low. As for the neutron detector with a scintillator, $^6$Li glass scintillator or a small neutron detector where a photo multiplier is arranged directly behind ZnS/$^6$LiF translucent neutron scintillator has been used as a neutron monitor or an experimental detector.

In addition, as for the neutron image detector used for the neutron scattering experiment which uses a neutron source etc. with nuclear reactor/particle accelerator, a detection system where many position-sensitivity $^3$He gas proportional counters are arranged or $^3$He gas multi-wire two dimension neutron detector, etc. have been used so far. Moreover, as for the neutron image detector with a scintillator, the detector which detects the one-dimensional or the two-dimensional neutron image where the incidence position of fluorescence emitted from $^6$Li glass scintillator or ZnS/$^6$LiF translucent neutron scintillator is coded by using the optical fiber or the wave length shift fiber and detected by a photo multiplier has been used so far.

In addition, a high-speed neutron detector has been developed, in which a transparent plastic scintillator or a transparent liquid scintillator is contained within a circular detector housing, the signals output from photo multipliers arranged on both sides are processed and measured at a high time resolution, and the incidence position of the fast neutron is measured based on the arrival time difference to the photo multipliers by utilizing the very short life time of fluorescent. Moreover, high-speed neutron/gamma discrimination is performed by utilizing the different rise time between the fast neutron and the gamma ray, because the gamma ray sensitivity is high in a plastic scintillator or a liquid scintillator.

[Non-patent Literature 1] Nucl. Inst. And Meth. 73 (1969) 225-227
[Non-patent Literature 2] Nucl. Inst. And Meth. 185 (1981) 165-174
[Non-patent Literature 3] Nucl. Inst. And Meth. 214 (1983) 401-413
[Non-patent Literature 4] Nucl. Inst. And Meth. A372 (1996) 246-252
[Non-patent Literature 5] Nucl. Inst. And Meth. A477 (2002) 373-377

BRIEF SUMMARY OF THE INVENTION

Although various kinds of neutron detectors or neutron image detectors have been developed, it was difficult to use $^3$He gas for the high count rate measurement or the timing measurement etc. which requires an ultra-high time resolution because the signal speed of the neutron detector which uses $^3$He gas is slow. Moreover, because the gamma-ray background signal is superimposed to the signal output from the detector as a stationary signal when it is necessary to measure the neutron emitted from the irradiated nuclear fuel in the ultra-high gamma-ray background though the gamma ray sensitivity which forms the background is low, it is difficult to take out a neutron signal normally.

It is a difficult situation to buy and to use $^3$He gas because it became several ten times more costly. In addition, it seems that $^3$He gas will decrease further in the future because it has been produced only by a special manufacturing method. Therefore, a $^3$He substitution type neutron detector is needed in the world now, and the development is advanced energetically. The detector expected most as a $^3$He substitution type detector under such a situation is a detector having a scintillator.

Although a small neutron detector where the photo multiplier is arranged directly behind a scintillator can operate at a high-speed timing, it was very difficult to obtain an excellent detector in the cost performance, which has a somewhat large felt area, because of the sensitivity for the gamma-ray background. Moreover, a photo counting method is used as a signal processing method in the neutron image detector in which the fluorescence emitted from the scintillator is coded by using optical fibers or wavelength shift fibers. Therefore, although the neutron felt area can be enlarged, it was not able to be used for the measurement which requires the accurate timing because the time resolution becomes 34 ns.

Moreover, it is difficult structurally to use the neutron image detector in which the fluorescence emitted from the scintillator is coded by using optical fibers or wavelength shift fibers under vacuum. Therefore, it was very difficult to use such a detector as a neutron image detector used for the neutron scattering experiment apparatus in the neutron scattering research facilities which uses the neutron source with a nuclear reactor/particle accelerator, in which the detector is inserted into a large vacuum tank and used under vacuum.

In addition, the detection sensitivity of the high-speed neutron detector with transparent plastic scintillator or a liquid scintillator is low in the region of the epithermal neutron from the low-energy neutron which is the measuring object of the neutron detector of the present invention. Therefore, it is necessary to use a $^6$Li transparent glass scintillator for making the same configuration as the above-mentioned high-speed neutron detector. However, such a detector has the demerits that the gamma ray sensitivity is high, the signal discrimination ability with the neutron is low, and the cost is high. Therefore, there is no development example so far. Moreover, because a fluorescent amount multiple-scatters at the various positions and enters the photo multipliers at both ends when the transparent scintillator is used, the decision of the neutron incidence position by using the fluorescent emission point and the solid angle of the photo multiplier is very difficult. Because the first rise time is by the fluorescence arrived via the shortest route, the neutron incidence position can be secured even if the fluorescence multiple-scattered enters the photo multiplier later. Therefore, the neutron incidence position is determined by using the arrival time difference.

An object of the present invention is to provide a neutron detector or a neutron image detector with a high neutron detection efficiency and an excellent gamma-proof performance which does not use $^3$He gas, in which a translucent type plate neutron scintillator having the structure capable to emit the fluorescence from double-sides, composed of ZnS fluorescent substance which is the polycrystalline powder and a neutron converter which contains $^6$Li or $^{10}$B, and the specular reflector are combined, whereby signals from the photo multipliers arranged at both ends are processed to detect.

In the present invention, a translucent type plate neutron scintillator having the structure capable to emit the fluorescence from double-sides, composed of ZnS fluorescent substance which is the polycrystalline powder and a neutron converter which contains $^6$Li or $^{10}$B is used as a scintillator to detect the neutron. The ZnS fluorescent substance mixed with $^6$LiF has been used as a neutron scintillator for 60 years or more because the gamma ray sensitivity is low. Moreover, it is known that fluorescent life time shortens and the gamma ray sensitivity decreases when the shorter wavelength component is taken out through a optical filter. Moreover, in a translucent type plate neutron scintillator having the structure capable to emit the fluorescence from both faces, the amount of emission of fluorescence is large, and the fluorescent distribution can have distribution characteristics which look like the Poisson distribution that the bottom cut is easy, because the fluorescence emitted after the internal reaction is emitted from the double-sides of the scintillator, and this fluorescence is detected.

In the present invention, the neutron image is measured by using that the principal ingredient of the fluorescence emitted from the translucent type neutron scintillator are two components of the component detected directly based on solid angle by two photo multipliers arranged at both ends and the component detected by two photo multipliers arranged at both ends after reflecting one time by specular reflector set up on the opposite side of the scintillator. Scattered fluorescence being not able to pass the translucent scintillator set up at the center of the detector housing contributes to this phenomenon. That is, because the incidence position of the neutron is almost in proportion to the solid angle, it becomes possible to detect the one-dimensional or the two-dimensional position, and secure a fluorescent amount necessary for the photo multiplier arranged at both ends.

On the other hand, as for the processing of the signals output from the photo multipliers, each signal processing is upgraded by performing sampling measurement using an analog/digital converter (ADC) of the sampling frequency of 100 MHz or more for simultaneous measurement by two photo multipliers, digitalizing, processing time series data signal recorded after recording in the memory as time series data, and securing the function to execute neutron/gamma discrimination signal processing described later and other processing at the same time.

Moreover, in the present invention, neutron/gamma discrimination signal processing is executed by using that fluorescent life properties of neutron and gamma ray is different in a translucent type plate neutron scintillator having the structure capable to emit the fluorescence from double-sides, composed of ZnS fluorescent substance which is the polycrystalline powder and a neutron converter which contains $^6$Li or $^{10}$B. The signal life time of the time series emission characteristic of the signal emitted by the reaction of gamma rays incident to the photo multiplier to the photoelectric surface is 30n or less, and it is very easy to determine. In addition, it is possible to detect the neutron under little dead time even if the gamma ray of the high intensity enters the photo multiplier by using the fact that gamma rays rarely enter two photo multipliers at the same time to output signals.

Concretely, in the neutron detector according to one aspect of the present invention, a translucent type plate neutron scintillator having the structure capable to emit the fluorescence from double-sides, composed of ZnS fluorescent substance and a neutron converter which contains $^6$Li or $^{10}$B is arranged at an angle of 45 degrees from the neutrons which are incident in parallel all together, inside of a cylindrical detector housing with the circular or square section where the specular reflector with the reflectance of 90% or more is arranged internally. And, the fluorescence emitted when the neutron enters the scintillator is detected by two photo multipliers arranged on both sides. Finally, the signals output from these two photo multipliers is processed to be taken out as a neutron signal.

In the neutron detector according to another aspect of the present invention, translucent type plate neutron scintillators having the structure capable to emit the fluorescence from double-sides, composed of ZnS fluorescent substance which is the polycrystalline powder and a neutron converter which contains $^6$Li or $^{10}$B are arranged in a criss-cross structure, inside of a cylindrical detector housing with the circular or square section where the specular reflector with the reflectance of 90% or more is arranged internally. One of the scintillators arranged in a criss-cross structure is arranged at an angle of 45 degrees from the neutrons which are incident in parallel all together, and the other is arranged at an angle of 135 degrees from the neutrons which are incident in parallel all together. And, the fluorescence emitted when the neutron enters the scintillator is detected by two photo multipliers arranged on both sides. Finally, the signals output from these two photo multipliers is processed to be taken out as a neutron signal.

In the one-dimensional neutron image detector according to one aspect of the present invention, the fluorescence emitted when the neutron enters the scintillator is detected by two photo multipliers arranged on both sides by using the configuration described in the above paragraph [0016] or [0017]. When two neutron signals output from these two photo multipliers are coincidence-measured at the predetermined duration, these neutron signals are synthesized by a summing circuit. The synthesized signal is input to a pulse height discrimination circuit, the trigger signal more than the predetermined level is taken out. The pulse height of the neutron signals output from two photo multipliers making this trigger signal a starting point is sampled and measured using an analog/digital converter (ADC) having the sampling frequency of 100 MHz or more. The signal that the sampling measurement is carried out is digitalized, and recorded in a memory as time series data. After that, the maximum digital peak value of the recorded time series data is obtained, the maximum digital peak value of the right photo multiplier is set as A, and the maximum digital peak value of the left photo multiplier is set as B. When the right edge of the scintillator is made a starting point at the neutron incidence position, the neutron incidence position is assumed to be X, the length of the scintillator is assumed to be L, the position correction term is assumed to be C, and the position offset term is assumed to be D, Neutron incidence position X is obtained from two maximum digital peak value based on the following expression.

$$X=(L+C)\times A^{1/2}/(A^{1/2}+B^{1/2})-D$$

Moreover, in the one-dimensional neutron image detector according to another aspect of the present invention, the fluorescence emitted when the neutron enters the scintillator is detected by two photo multipliers arranged on both sides by using the configuration described in the above paragraph [0016] or [0017]. When two neutron signals output from these two photo multipliers are coincidence-measured at the predetermined duration, these neutron signals are synthesized by using a summing circuit. The synthesized signal is input to a pulse height discrimination circuit, and the trigger signal more than the predetermined level is taken out. The pulse height of the neutron signals output from the two photo multipliers making this trigger signal a starting point is sampled and measured using an analog/digital converter (ADC) having the sampling frequency of 100 MHz or more. The signal sampled and measured is digitalized, and recorded in a memory as time series data. After that, the maximum digital peak value of the recorded time series data is obtained, the maximum digital peak value of the right photo multiplier is set as A, and the maximum digital peak value of the left photo multiplier is set as B. The incidence position is input to the nonvolatile memory beforehand as a memory array of the maximum digital peak value of the left photo multiplier and the maximum digital peak value of the left photo multiplier. A and B obtained by the measurement are input to this memory array, and the right edge of the scintillator is made a starting point at the neutron incidence position, and neutron incidence position X is obtained.

In the two-dimensional neutron image detector according to one aspect of the present invention, a translucent type plate neutron scintillator having the structure capable to emit the fluorescence from double-sides, composed of ZnS fluorescent substance which is the polycrystalline powder and a neutron converter which contains $^6$Li or $^{10}$B is arranged at right angles to the neutrons incident in parallel and all together, inside a cylindrical detector housing of which the inner surface is mirror finished. Two photo multipliers for the X-axis are arranged oppositely in a horizontal direction of the detection housing and two photo multipliers for the Y-axis are arranged oppositely in a vertical direction of the detection housing. The neutron incidence position in an X-axis direction and the neutron incidence position in a Y-axis direction are obtained by using the configuration described in the above paragraph [0018] or [0019].

Effects of the Invention

According to the present invention, a neutron detector or a neutron image detector with high neutron detection efficiency and excellent anti-gamma ray performance can be obtained without unacquirable $^3$He gas by combining a translucent type plate neutron scintillator having the structure capable to emit the fluorescence from double-sides, composed of ZnS fluorescent substance which is the polycrystalline powder and a neutron converter which contains $^6$Li or $^{10}$B, and specular reflectors.

BRIEF DESCRIPTION OF SEVERAL DRAWINGS

DETAILED DESCRIPTION OF THE INVENTION

<Embodiment 1>

Figure 1:
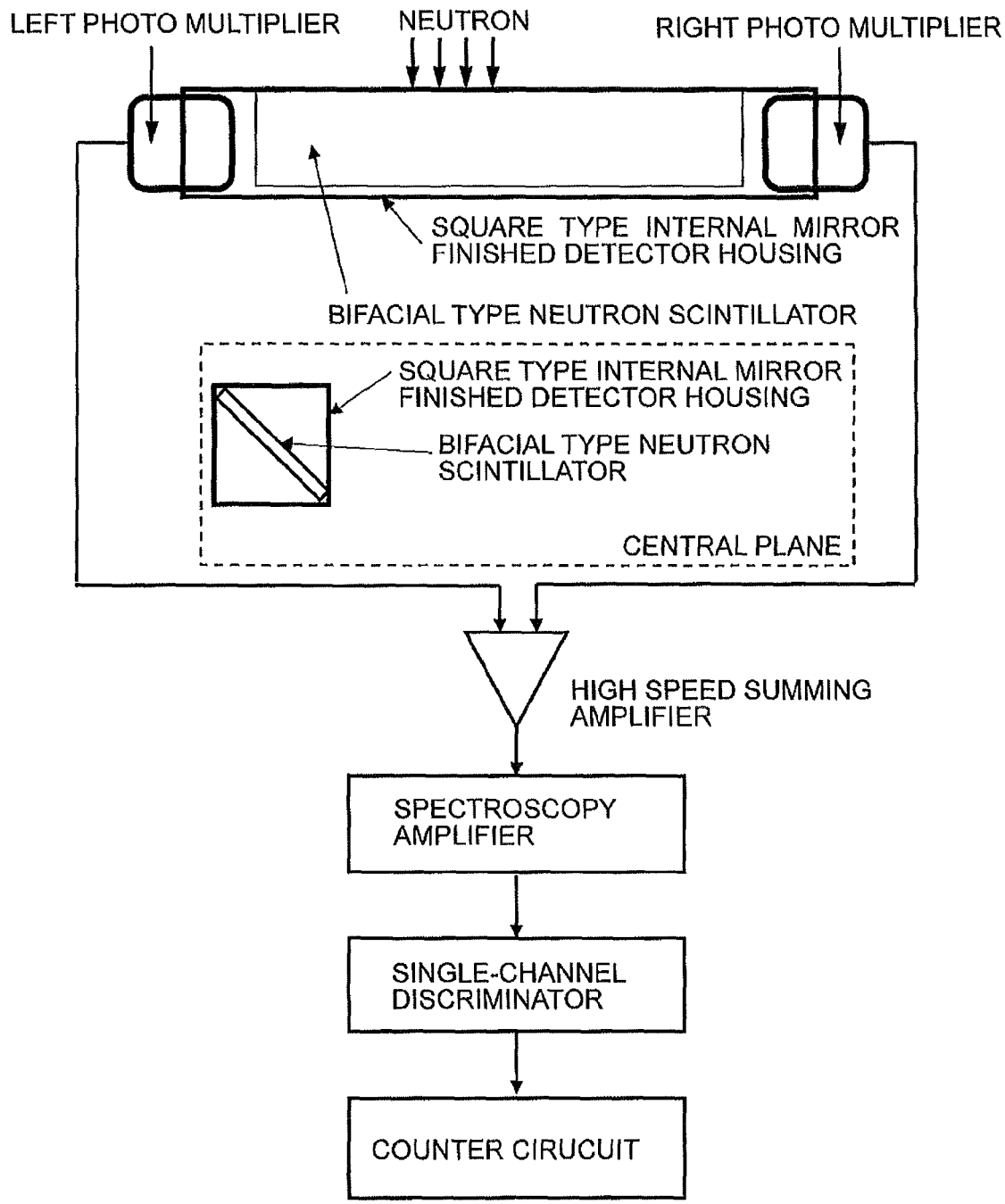
FIG. 1 is a block diagram showing a neutron detector according to one embodiment of the present invention.

A neutron detector according to embodiment 1 of the present invention is explained referring to FIG. 1. This neutron detector has the following structures. A translucent type plate neutron scintillator having the structure capable to emit the fluorescence from double-sides, composed of ZnS fluorescent substance which is the polycrystalline powder and a neutron converter which contains $^6$Li or $^{10}$B is arranged inside a cylindrical detector housing with the square section where the specular reflector is provided internally. The fluorescence emitted from the neutron scintillator is detected by two photo multipliers arranged on both sides.

ZnS:Ag and Cl were used as ZnS fluorescent substance of the translucent type neutron scintillator. Moreover, $^{10}$B$_2$O$_3$ whose neutron capture cross section is about four times larger than $^6$Li was used as a neutron converter. ZnS/$^{10}$B$_2$O$_3$ translucent type neutron scintillator in which the mixed ZnS/$^{10}$B$_2$O$_3$ is spread on the glass and sintered was used so that the fluorescence may be emitted from double-sides. The thickness of the detection body part is 300 μm, and the thickness of the glass board is 400 μm. This scintillator was used after laminating with the laminate film of 100 μm in thickness along with the glass board because $^{10}$B$_2$O$_3$ has hygroscopicity. As for one scintillator, the size of the main body of the scintillator is 38 mm in width and 250 mm in length. The size after laminating was 40 mm in width and 256 mm in length.

The cross-sectional shape of the detector housing was assumed to be a square, the aluminum board of 0.8 mm in thickness is used for manufacturing, and inside diameter and length were assumed to be 30 mm×30 mm and 300 mm, respectively. Next, the reflecting plate made of aluminum of 30 mm×30 mm in outside diameter and 250 mm in length was arranged at the center location of the detector. The thickness of the reflecting plate is 0.3 mm. High reflectance aluminum sheet "MIRO" made by Material House Co., Ltd. was used as a substance of the reflecting plate made of aluminum. The total reflectivity of this aluminum sheet is 95% or more and the diffuse reflectance is less than 5%.

At the position of the reflecting plate made of aluminum inside the detector housing, the above-mentioned translucent type neutron scintillator is arranged at an angle of 45 degrees from the neutrons which enter in parallel all together. The thickness of the scintillator is substantially increased by 1.42 times and the detection efficiency is improved by inclining 45 degrees as is known well in the past.

The fluorescence emitted from the neutron scintillator is detected by two photo multipliers arranged on both sides of the detector housing. R11265-100 made by Hamamatsu Photonics K.K. (Japan) of 30 mm×30 mm in outside diameter and 30 mm in length was used in this embodiment. The voltage of −800 V was applied as an electrode bias.

The neutron signals output from two photo multipliers is processed by the signal processing method which has been used so far to evaluate the detection efficiency. The neutron signals output from two photo multipliers was input to a summing amplifier made by Japan Atomic Energy Agency to synthesize them, and then to a spectroscopy amplifier Model 12021 made by Canberra Industries Inc. (USA). The waveform shaping time constant of this amplifier was set in 250 ns. After amplification and wave shaping, the neutron signal is input to timing single channel discriminator Model1430 made by Canberra Industries Inc. to perform the waveform discrimination. And, the neutron signal taken out as a pulse signal is counted by a counter circuit.

The detection efficiency of this detector was measured by using Am-Li radiation source of 7.4 GBq as a neutron source and making the thermal neutron with paraffin block of 5 cm in thickness. The comparative measurement was performed between the standard $^3$He proportional counter having the outside diameter of 1 inch and $^3$He of 4 atmospheric pressures and the detector of the present invention to obtain the relative detection efficiency. The neutron counting measurement was performed in multi-scaling at intervals of one second to obtain the information on the signal stability etc. in this comparison examination.

Figure 2:
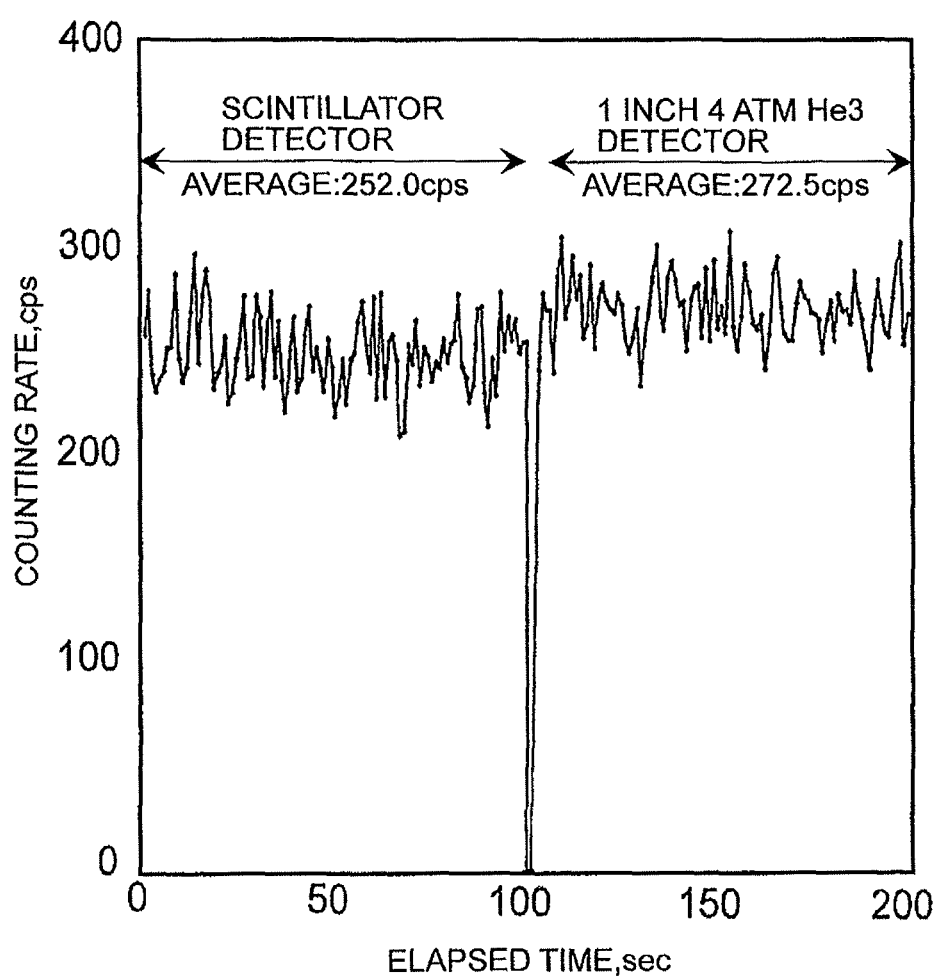
FIG. 2 shows a comparative measurement result of the relative detection efficiency between the $^3$He proportional counter and the detector of the present invention.

The measurement result of the comparison experiment is shown in FIG. 2. The first 100 seconds show the measurement results on the detector of this embodiment, and the second 100 seconds show the measurement results on the standard $^3$He proportional counter of 4 atmospheric pressures. The average counting rate due to the standard $^3$He proportional counter was 272.5 cps while the average counting rate due to the detector of this embodiment was 252 cps. As for the neutron felt area, the detector of this embodiment is 30 mm×250 mm though the standard $^3$He proportional counter is 25.4 mm×250 mm. Therefore, the relative detection efficiency of this detector was obtained by correcting the felt area. As a result, it was able to confirm that it was efficiency of 73% to the standard $^3$He proportional counter of 4 atmospheric pressures. For example, the absolute detection efficiency of this detector becomes the value which exceeds 50% a little because the absolute detection efficiency to the thermal neutron of $^3$He proportional counter of 4 atmospheric pressures is 70%. Therefore, this detector is in the region which can be used as $^3$He substitution detector.

Figure 3:
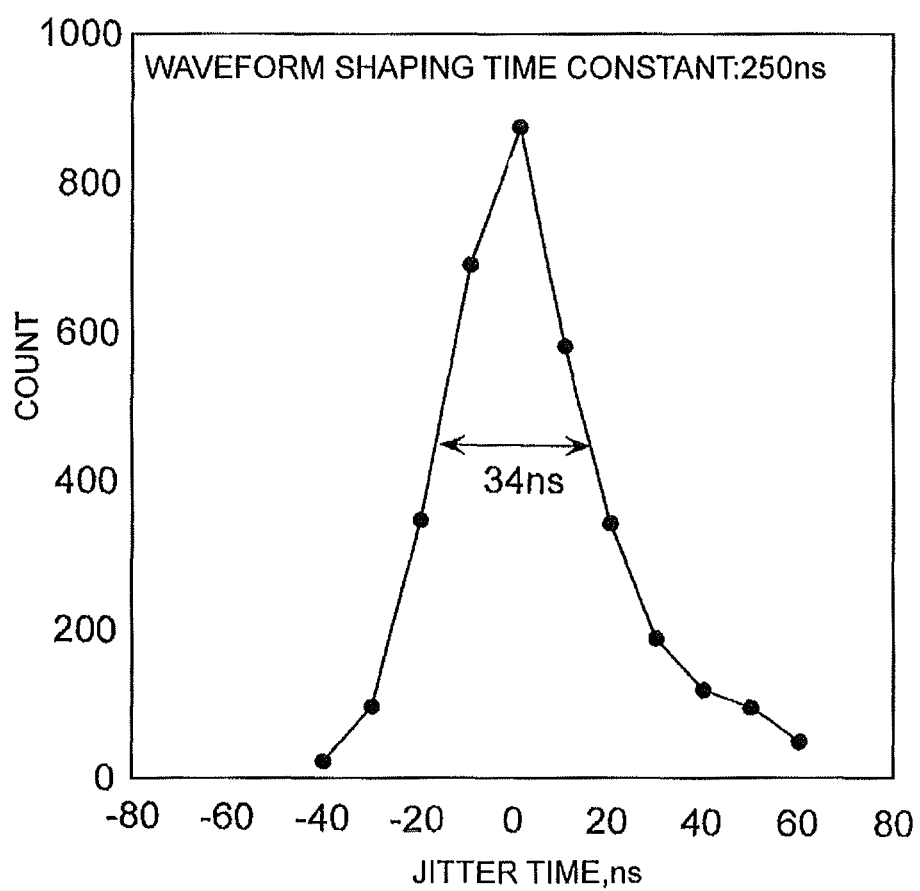
FIG. 3 shows a measurement result of time jitter at incidence time.

The time jitter of the incidence time which is the detector performance to be solved by the present invention was measured by using an oscilloscope in connection with the case in which the conventional signal processing is executed to examine the timing signal when the neutron enters. The measurement results are shown in FIG. 3. There was a time jitter of about 34 ns in half band width when the waveform shaping time constant of the spectroscopy amplifier was set to 250 ns in the conventional method. As a result, it was confirmed that it was difficult to secure the necessary performance in the conventional signal processing method.

<Embodiment 2>

Figure 4:
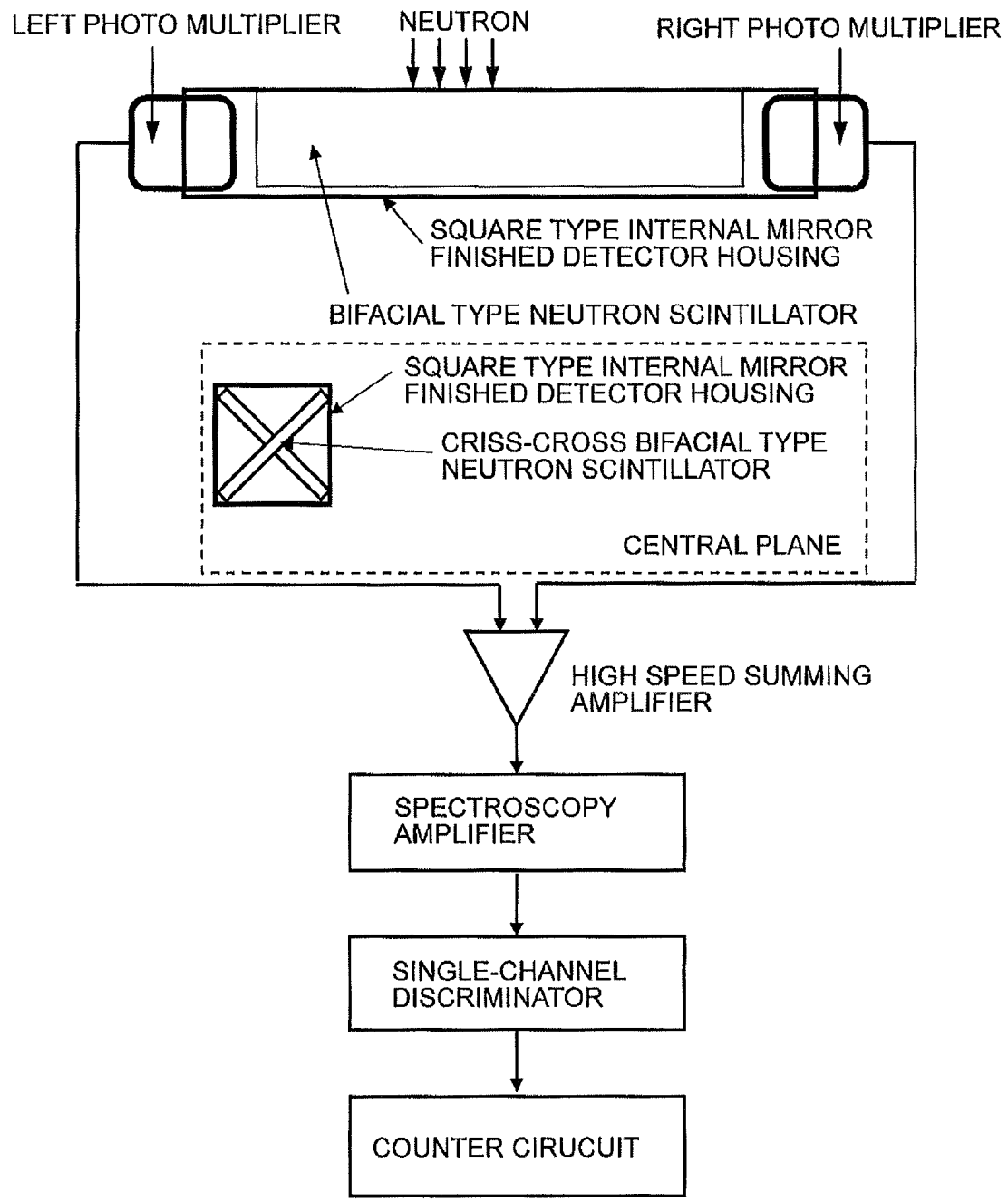
FIG. 4 is a block diagram showing a neutron detector according to another embodiment of the present invention.

The neutron detector according to embodiment 2 is explained referring to FIG. 4. This neutron detector has the following structures. Two translucent type plate neutron scintillators having the structure capable to emit the fluorescence from double-sides, composed of ZnS fluorescent substance which is the polycrystalline powder and a neutron converter which contains $^6$Li or $^{10}$B (SSS) are arranged in a criss-cross structure. These scintillators are arranged inside a cylindrical detector housing with the square section where the specular reflector is provided internally. The fluorescence emitted from the neutron scintillator is detected by two photo multipliers arranged on both sides and taken out as a neutron signal.

ZnS:Ag and Cl were used as ZnS fluorescent substance of the translucent type neutron scintillator. Moreover, $^{10}$B$_2$O$_3$ whose neutron capture cross section is about four times larger than $^6$Li was used as a neutron converter. ZnS/$^{10}$B$_2$O$_3$ translucent type neutron scintillator in which the mixed ZnS/$^{10}$B$_2$O$_3$ is spread on the glass and sintered was used so that the fluorescence may be emitted from double-sides. The thickness of the detection body part is 300 μm, and the thickness of the glass board is 400 μm. This scintillator was used after laminating with the laminate film of 100 μm in thickness along with the glass board because $^{10}$B$_2$O$_3$ has hygroscopicity. As for one scintillator, the size of the main body of the scintillator is 38 mm in width and 250 mm in length. The size after laminating was 40 mm in width and 256 mm in length. A criss-cross structure type scintillator according to this embodiment was configured as follows. The main body of the scintillator manufactured is 18 mm in width and 250 mm in length. And, two scintillators having the size of 19 mm in width and 256 mm in length after laminating were manufactured, and each was arranged at right angles to each other as shown in the sectional view of the detector housing of FIG. 4.

The cross-sectional shape of the detector housing was assumed to be a square, the aluminum board of 0.8 mm in thickness is used for manufacturing, and inside diameter and length were assumed to be 30 mm×30 mm and 300 mm, respectively. Next, the reflecting plate made of aluminum of 30 mm×30 mm in outside diameter and 250 mm in length was arranged at the center location of the detector. The thickness of the reflecting plate is 0.3 mm. High reflectance aluminum sheet "MIRO" made by Material House Co., Ltd. was used as a substance of the reflecting plate made of aluminum. The total reflectivity of this aluminum sheet is 95% or more and the diffuse reflectance is less than 5%.

At a position of the reflecting plate made of aluminum, Main scintillator is arranged at an angle of 45 degrees from the neutrons which are incident in parallel all together, and the remainder is arranged at an angle of 135 degrees from the neutrons which are incident in parallel all together as shown in the sectional view of FIG. 4. As a result, the effective thickness of the scintillator is increased by 2.82 times, and thus the detection efficiency is raised.

The fluorescence emitted from the neutron scintillator is detected by two photo multipliers arranged on both sides of the detector housing. R11265-100 made by Hamamatsu Photonics K.K. (Japan) of 30 mm×30 mm in outside diameter and 30 mm in length was used in this embodiment. The voltage of −800 V was applied as an electrode bias.

The neutron signals output from two photo multipliers is processed by the signal processing method which has been used so far to evaluate the detection efficiency. The neutron signals output from two photo multipliers was input to a summing amplifier made by Japan Atomic Energy Agency to synthesize them, and then to a spectroscopy amplifier Model 2021 made by Canberra Industries Inc. (USA). The waveform shaping time constant of this amplifier was set in 250 ns. After amplification and wave shaping, the neutron signal is input to timing single channel discriminator Model1430 made by Canberra Industries Inc. to perform the waveform discrimination. And, the neutron signal taken out as a pulse signal is counted by a counter circuit.

The detection efficiency of this detector was measured by using Am-Li radiation source of 7.4 GBq as a neutron source and making the thermal neutron with paraffin block of 5 cm in thickness. The comparative measurement was performed between the standard $^3$He proportional counter having the outside diameter of 1 inch and $^3$He of 4 atmospheric pressures and the detector of the present invention to obtain the relative detection efficiency. The neutron counting measurement was performed in multi-scaling at intervals of one second to obtain the average value. The average counting rate due to the standard $^3$He proportional counter was 272.5 cps. While, the average counting rate due to the detector of this embodiment was 355 cps. As for the neutron felt area, the detector of this embodiment is 30 mm×250 mm though the standard $^3$He proportional counter is 25.4 mm×250 mm. Therefore, we obtained the relative detection efficiency of this detector by correcting the felt area. As a result, we confirmed that it was efficiency of 103%. Moreover, when the signal processing is executed in the conventional method, the criss-cross structure type scintillator has the 1.4 times detection efficiency larger than that of one sheet translucent type neutron scintillator shown in the embodiment.

<Embodiment 3>

Figure 5:
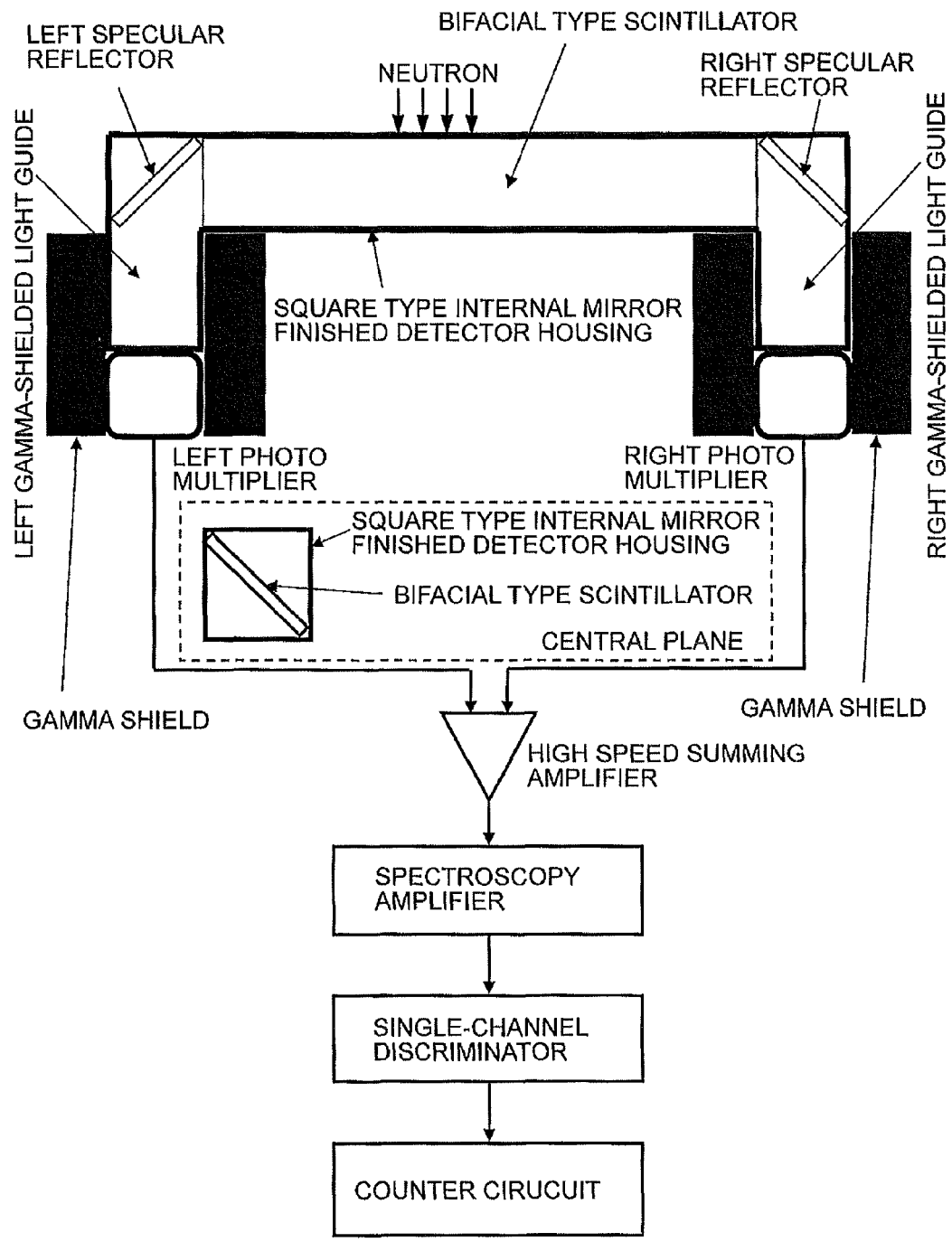
FIG. 5 is a block diagram showing a neutron detector according to a further embodiment of the present invention.
Figure 6:
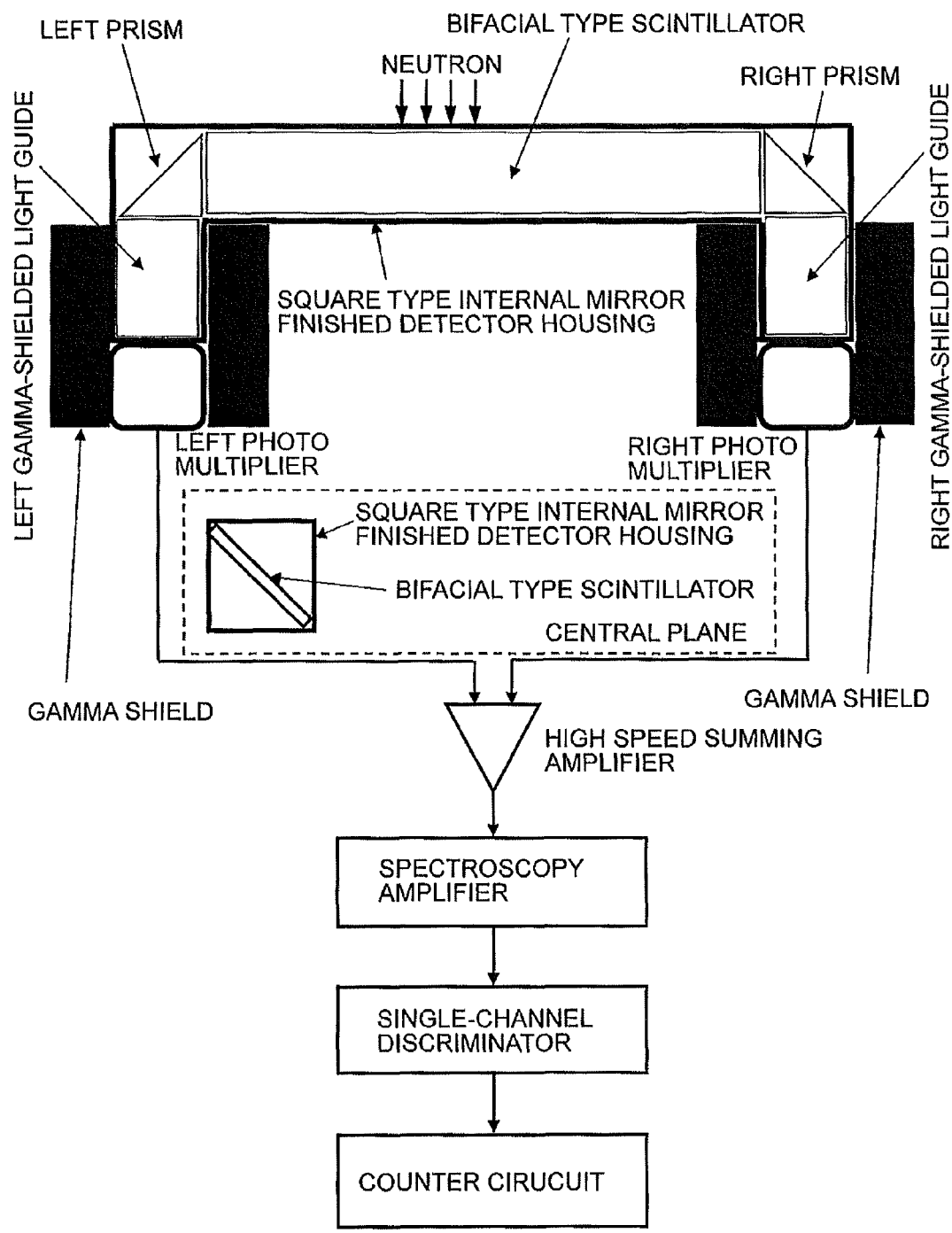
FIG. 6 is a block diagram showing a neutron detector according to a further embodiment of the present invention.

The neutron detector according to embodiment 3 is explained referring to FIG. 5 and FIG. 6. This neutron detector has the following structure in order to guide the fluorescence emitted when the neutron enters scintillator to the photo multiplier. The reflected fluorescence is guided to the glass light guide with gamma ray shielding properties by arranging mirrors or prisms which has the reflection angle of 45 degrees from its center axis on both sides of the detector housing. The guided fluorescence is detected by the photo multiplier provided behind each light guide. The influence of the background gamma radiation caused by the photoelectric surface of the photo multiplier is reduced by adopting this structure. As the detector of this embodiment, a detector having a square section is used as shown in embodiment 1.

It is required to measure the neutron under the field of the gamma rays of a high intensity irradiated from the spent fuels in the nuclear security field where the neutrons emitted from spent fuels of a nuclear reactor are measured and the amount of uranium or plutonium in the fuel is measured. The influence of gamma rays on the detector of the present invention is primarily as follows.

(1) Translucent type neutron scintillator which uses ZnS for detecting the neutron reacts to gamma rays and the fluorescence is output.
(2) Gamma rays reach the photo multiplier directly and react on the photoelectric surface, and pulse signals are output.

Japanese Patent No. 4,415,095 and U.S. Pat. No. 679,064 have already disclosed that the influence of gamma rays is reduced by using a optical filter in connection with the former translucent type neutron scintillator which uses ZnS. Therefore, the optical filter that has the transmittance to a wave length shorter than 450 nm shown in FIG. 7 is installed in the photo multiplier of all embodiments including this embodiment 3.

However, it is very difficult to decrease the output of the gamma rays pulse signal by the photo multiplier when the strength of gamma rays increases very much in the latter case. Therefore, it is necessary to prevent gamma rays from reaching the photo multiplier.

In embodiment 3 of the present invention, the glass light guide with large gamma ray shielding properties is arranged ahead of the photo multiplier to reduce the amount of the arrival of gamma rays to the photoelectric surface as shown in FIG. 5 and FIG. 6. In the example of FIG. 5, the specular reflector is arranged at an angle of 45 degrees at positions of two photo multipliers inside the detector housing shown in embodiment 1. The prism to guide the fluorescence in a direction of 90 degrees is arranged in the example of FIG. 6. The fluorescence after passing the prism is received by the glass light guide with large gamma ray shielding properties, and then detected by the photo multiplier arranged on the other edge. In FIG. 6, the glass light guide may be integrated with the prism. The integrated structure is better from a viewpoint of the light guide of fluorescence. High reflectance aluminum sheet "MIRO" made by Material House Co., Ltd. can be used as a member of the reflecting plate. Moreover, the material of the prism and the light guide has to be glass of high atomic number material effective for the gamma rays shield, and possess the properties which are not colored by the irradiation of the high-strength gamma rays. Therefore, the glass with a good transmission characteristic on the shorter wavelength side from wave length 450 nm of ZnS:Ag,Cl fluorescent substance and is needed as an optical characteristic. The SF6 type flint glass made by Sumita Optical Glass, Inc. (Japan) was used in this embodiment. It was confirmed that the transmission characteristics of this glass cover the transmission wavelength region of ZnS:Ag,Cl fluorescent substance from 390 nm to 600 nm. It was also confirmed that radiation damage is a level of the loss of about 10% up to $10^4$ grays of the irradiation intensity of gamma rays. The length of the light guide part which defines the shield ability to gamma rays was set to 5 cm in the present invention. The size of the section of the light guide was set to be 30 mm×30 mm. This light guide part has the ability to shield 1/10 or more of 662 keV gamma rays emitted from Cs137 as nuclear species. The product R11265-100 made by Hamamatsu Photonics K.K. (Japan) of 30 mm×30 mm in size and 30 mm in length as two photo multipliers used.

Figure 7:
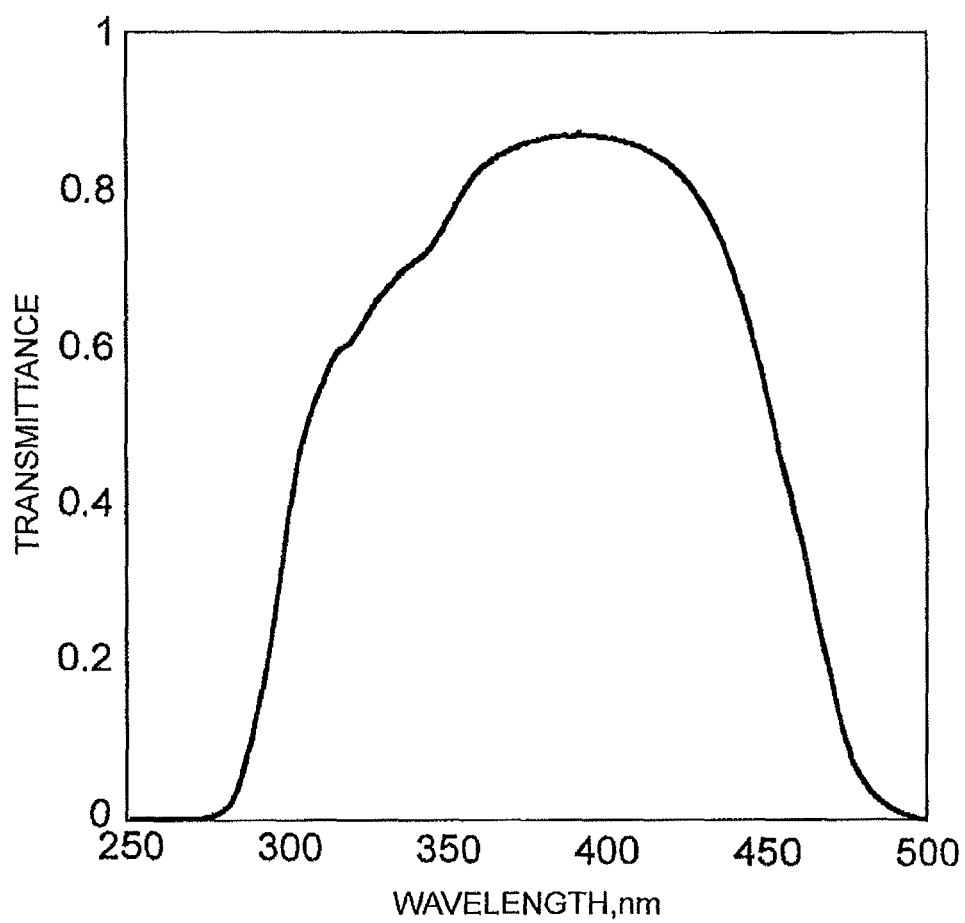
FIG. 7 shows a transmission characteristic of optical filter.

The surrounding area of the detector and the light guide arranged on both sides of the detector is shielded with lead blocks of 3 cm in thickness in order to shield the gamma rays which enter diagonally from the part ahead of the detector housing as shown in FIG. 6 and FIG. 7.

<Embodiment 4>

Figure 8:
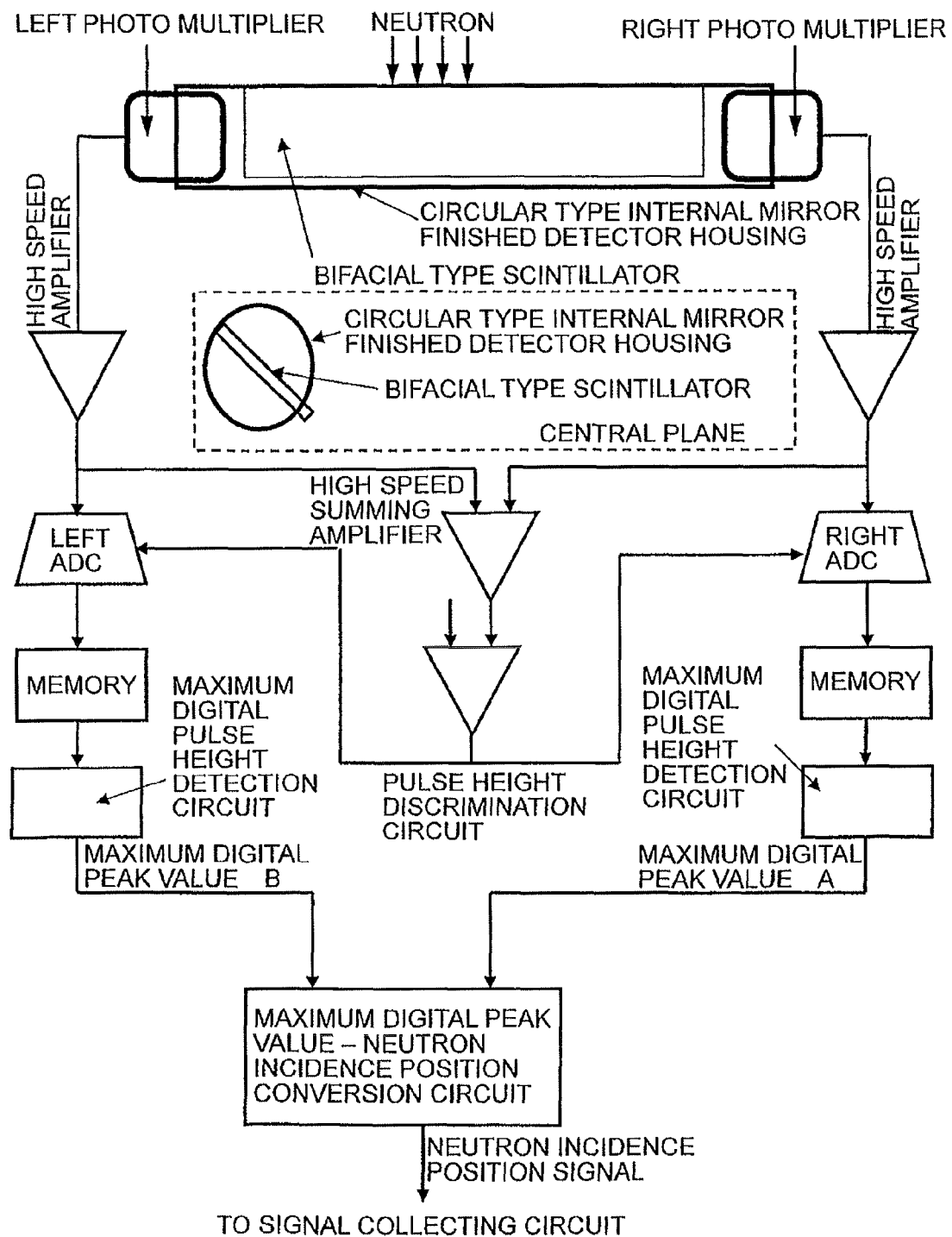
FIG. 8 is a block diagram showing a one-dimensional neutron image detector according to one embodiment of the present invention.

The one-dimensional neutron image detector according to embodiment 4 is explained referring to FIG. 8. In this one-dimensional neutron image detector, the fluorescence emitted when the neutron enters the scintillator is detected by two photo multipliers arranged on both sides, a digital peak value are obtained, and the incidence position of the neutron to the scintillator is obtained. As the detector of this embodiment, a detector having a circular section is used in the structure shown in embodiment 1.

The detector housing is composed of the aluminum cylindrical tube of 30 mmϕ in outside diameter, 28 mmϕ in inside diameter, 2 mm in thickness, and 300 mm in length, and the reflecting plate made of aluminum of 26 mmϕ in outside diameter and 240 mm in length is arranged in the inside center location. At the same position as the reflecting plate made of aluminum, translucent type neutron scintillator of 26 mm in width and 240 mm in length described in embodiment 1 is arranged at an angle of 45 degrees from the neutrons which are incident in parallel. Two photo multipliers which detect the fluorescence emitted when the neutron enters the scintillator are arranged on both sides of the detector housing. The product 8135 made by Hamamatsu Photonics K.K. (Japan) of 24 mm in outside diameter and 60 mm in length in this embodiment. And, the voltage of 1100V was applied as an electrode bias.

When sampling and measuring the signals output from two photo multipliers in this embodiment, the signals are synthesized by a summing circuit after the neutron signals output from two photo multipliers are amplified by high-speed amplifiers. The synthesized signal is input to a pulse height discrimination circuit, and the trigger signal larger than the predetermined level is output. The FPGA (Field-Programmable Gate Array) circuit is used for the digital signal processing which will be described hereafter in this embodiment. HD64F30488VTE25V made by Altera Corporation (The United States) was used as FPGA. The op-amp AD8007 made by Analog Devices, Inc. (The United States) was used as the high-speed amplifier, in which the gain is set to twice. This trigger signal is made as a starting point, the pulse height of the neutron signals output from two photo multipliers is sampled and measured by operating the analog/digital converter (ADC) using the sampling frequency of 200 MHz. AD9626 made by Analog Devices, Inc. was used as analog/digital converter (ADC). Time series data converted from analog data to digital data is recorded in a memory of FPGA. Because the conversion number of bits of ADC is 11 bits, the electrode bias of the photo multiplier was set to 800V so that the neutron waveform signal emitted from translucent type neutron scintillator can be defined by 11 bits (2048). Moreover, the recording time to the memory was assumed to be 1 μs or less.

Maximum digital peak value A of a right photo multiplier and maximum digital peak value B of a left photo multiplier were obtained by reading data from time series data recorded after sampling the waveform signals output from two photo multipliers, and comparing sequentially the time series data.

Figure 9:
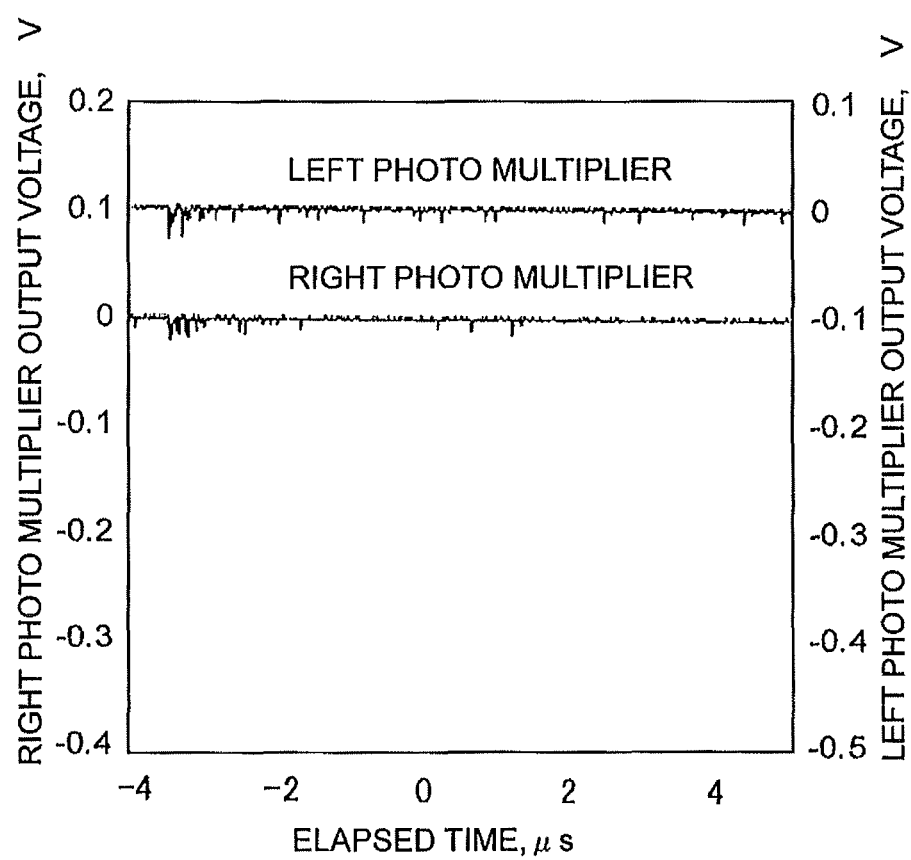
FIG. 9 shows signal waveforms output from two photo multipliers.
Figure 10:
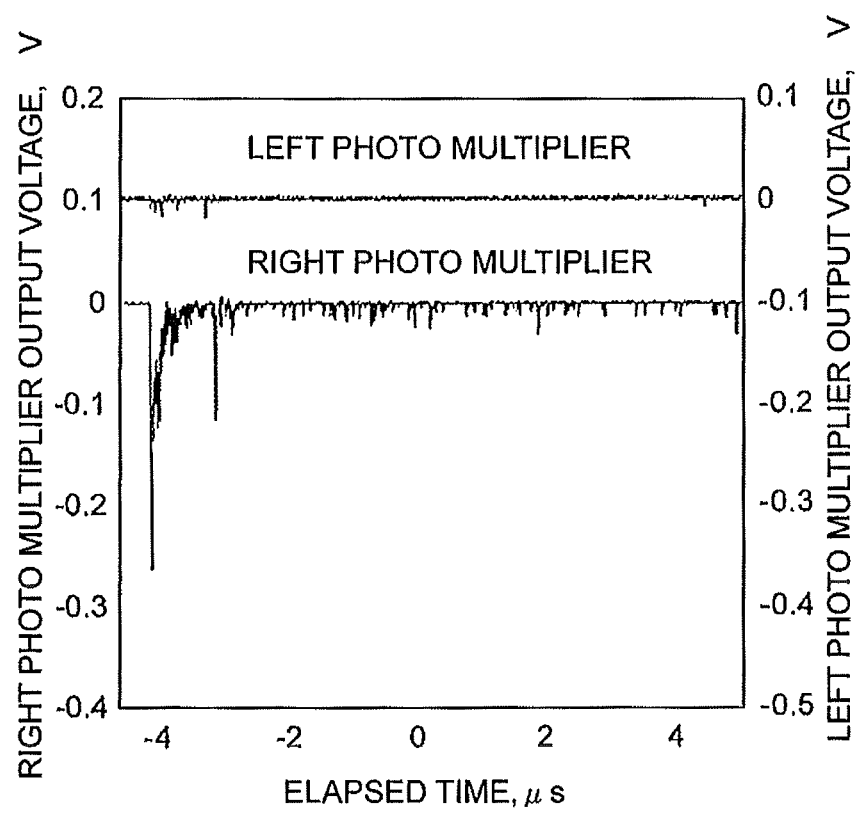
FIG. 10 shows signal waveforms output from two photo multipliers.

The waveform signals output from two photo multipliers when the collimated neutron beam enters in the central part and the edge parts of the detector which are the neutron felt areas are shown in FIG. 9 and FIG. 10. When the neutron beam is irradiated to the center, the maximum digital peak values output from two photo multipliers shows almost the same peak value. And, when the neutron beam is irradiated to the edge parts, the maximum peak value output from the photo multiplier on the irradiated edge part is very high, and the maximum digital peak value of the photo multiplier on the other edge part indicates a very low value. In the present invention, the incidence position of the neutron is derived by using the change in this maximum digital peak value.

It is understood that the neutron discriminator thresholds in embodiments 6-12 described later depend on the magnitude of the maximum digital peak value of the photo multiplier on the other edge. When the detector section is a circle and the outside diameter is 30 mmϕ in this embodiment, the maximum length of the scintillator inside the detector is near 25 cm from the viewpoint of the solid angle. Moreover, when the detector section is a square and the size is 30 mm×30 mm, the maximum length is near 25 cm from the viewpoint of the solid angle as well as the above-mentioned case.

And, the right edge of the scintillator is made a starting point at the neutron incidence position, the neutron incidence position is assumed to be X, the length of the scintillator is assumed to be L, the position correction term is assumed to be C, and the position offset term is assumed to be D, Neutron incidence position X is obtained from the following expression.

$$X=(L+C)\times A^{1/2}/(A^{1/2}+B^{1/2})-D$$

This maximum digital peak value—neutron incidence position conversion expression uses that the fluorescence emitted from the neutron incidence position depends on the solid angle which looks on to two photo multipliers at the neutron incidence position.

The obtained position information of 8 bits is converted into the LVDS standard signal, output as a parallel signal, and is accumulated as a position information in a signal collecting circuit.

Figure 11:
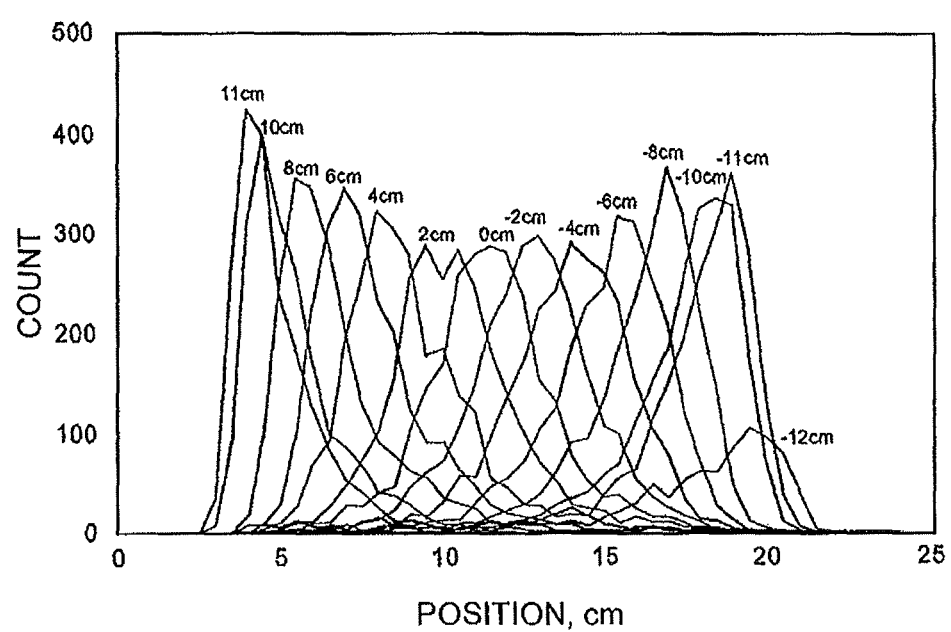
FIG. 11 is a graph showing the relationship between the measurement position and the count.
Figure 12:
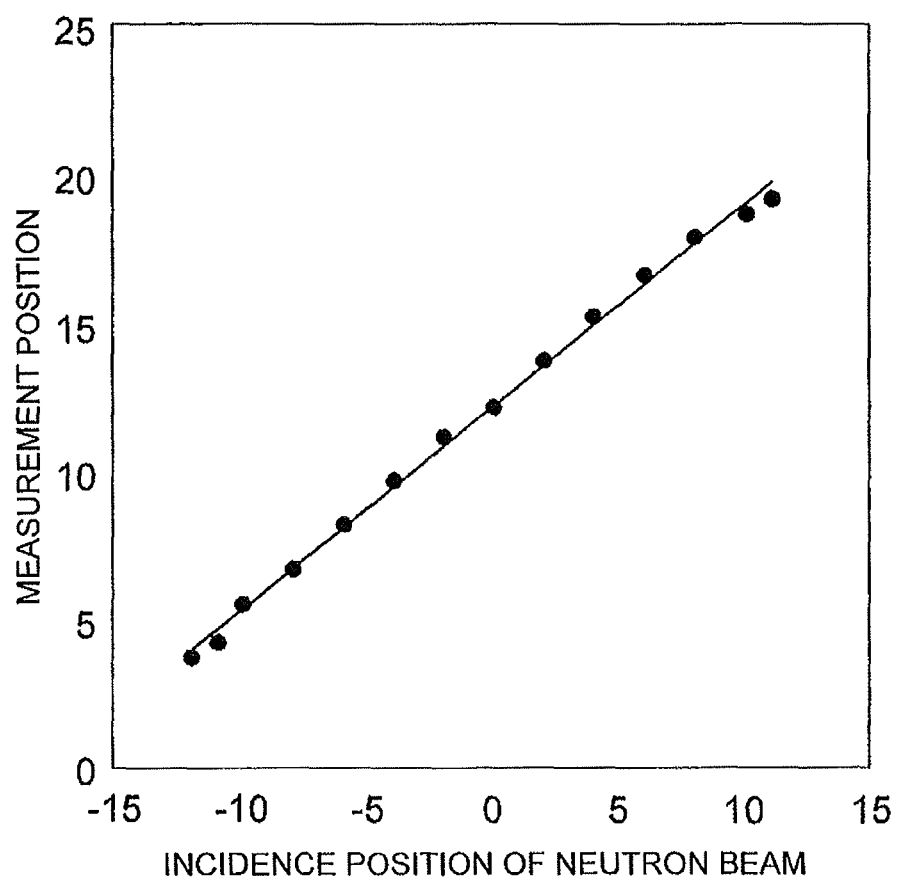
FIG. 12 is a graph showing the relationship between the incidence position of neutron beam and the measurement position.

Experiments to evaluate the one-dimensional detector of the embodiment was carried out by using the thermal neutron beam of "Musashi" neutron experiment device of JRR-3 Reactor Neutron Research Facilities of Japan Atomic Energy Agency. This experiment was carried out by using the collimated thermal neutron beam of 3 mmϕ and by setting up the detector in the movable carriage so that the incidence position to the neutron detector may be shifted in a direction of X-axis. With regard to the Y-axis direction of the one-dimensional image detector, the collimated beam is irradiated to the center location of Y-axis. As to the X-axis direction, the detector is moved every 1 cm within the range of 12 cm from the center to both sides and the detection characteristic at a position of the detector was measured. The frequency distribution of at the measurement position which had been obtained by the above-mentioned expression was plotted for each incidence position based on two maximum digital peak value measured at each position. This results are shown in FIG. 11. The position offset term is adjusted to 0 in the plot of FIG. 11. The positions of the moved neutron and the measurement result based on this result was plotted. This results are shown in FIG. 12. The linearity was secured as a result, and it was confirmed to operate as the one-dimensional image neutron detector.

Figure 13:
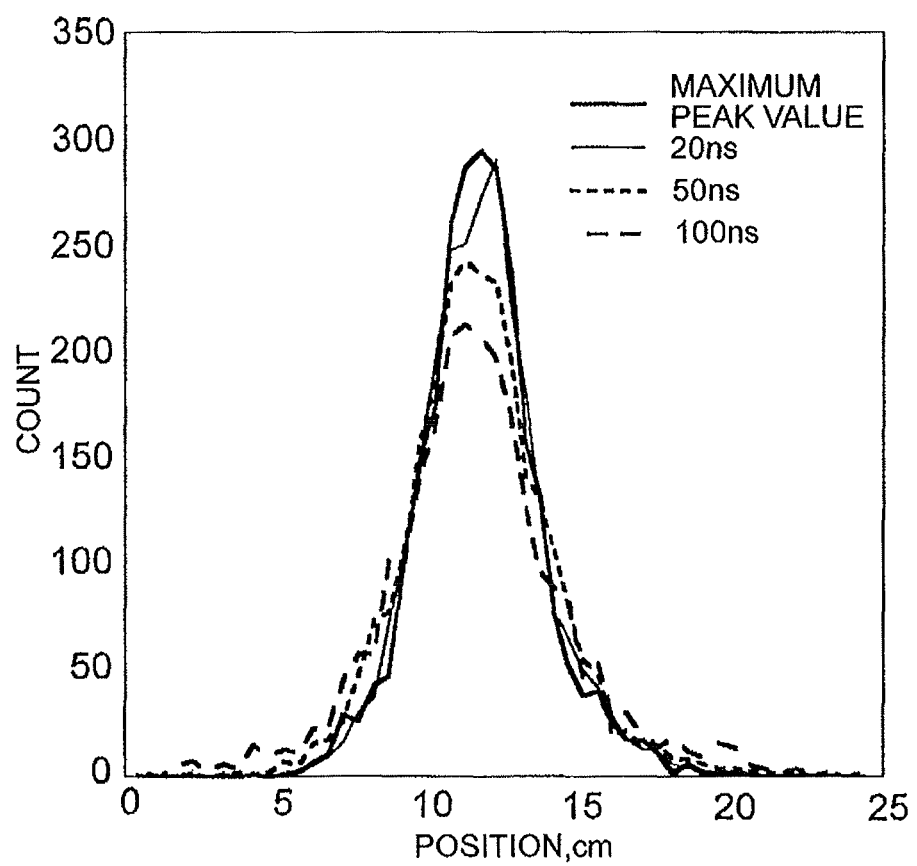
FIG. 13 is a graph showing the frequency distribution at the measurement position.

Moreover, it is thought that the position resolution is improved due to the increase in the data on the fluorescent amount when the sampling measurement by ADC is performed for a fixed period of time after passing the maximum value. As an example, the evaluation of the position resolution was attempted without using the maximum digital peak value. Where, the position resolution was evaluated by plotting the frequency distribution after the position information is obtained by using the above-mentioned expression based on the integral values. The evaluation result at the position of 0 cm which is the center location of X-axis is shown in FIG. 13. It was confirmed that the position resolution worsened as integral action time became long, and that the best resolution is obtained when the maximum digital peak value is used in the present invention.

<Embodiment 5>

Figure 14:
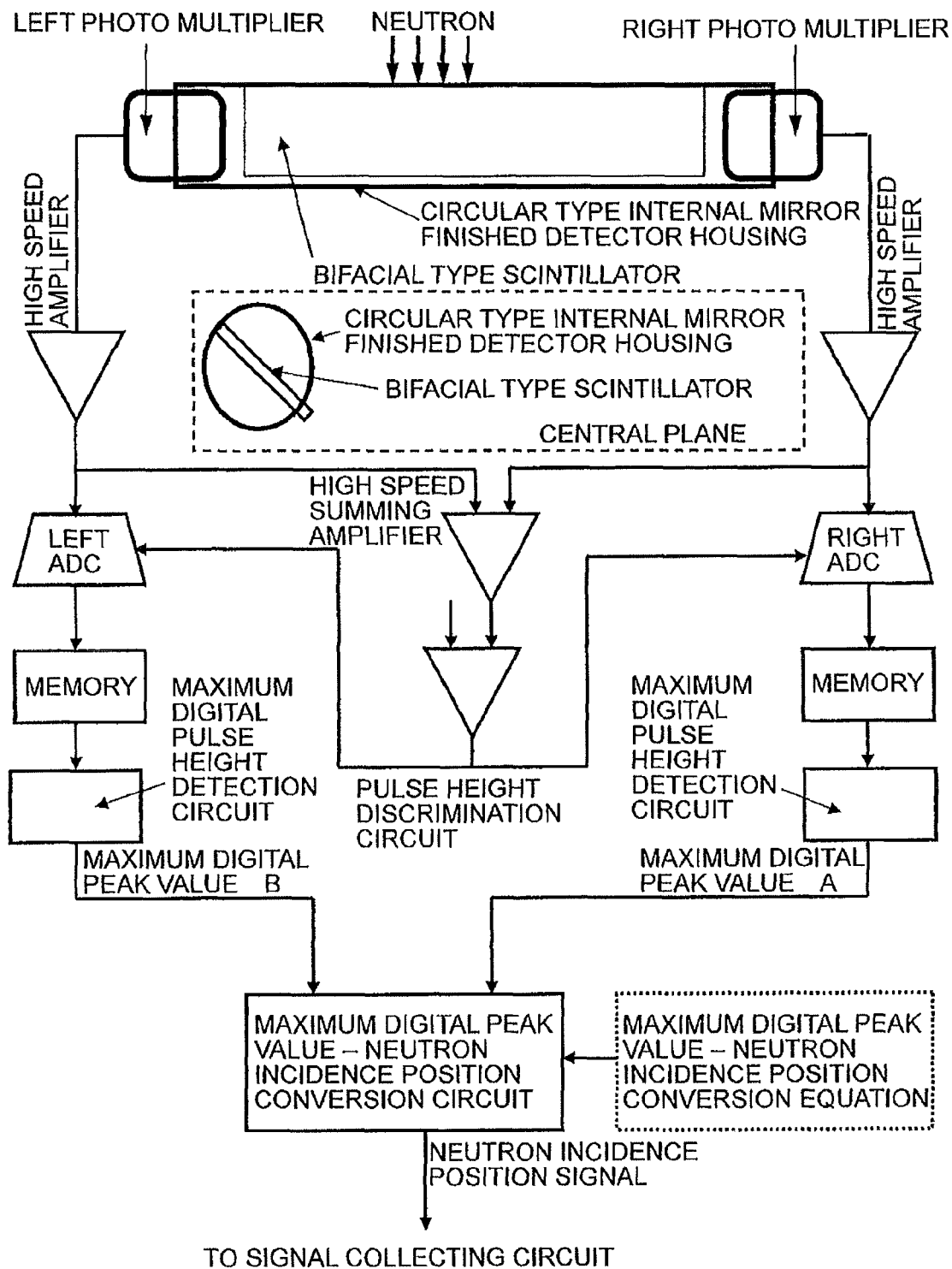
FIG. 14 is a block diagram showing a one-dimensional neutron image detector according to another embodiment of the present invention.

The one-dimensional neutron image detector according to embodiment 5 is explained referring to FIG. 14. In embodiment 5, the fluorescence emitted when the neutron enters the scintillator is detected by two photo multipliers arranged on both sides. The incidence position of the neutron to the scintillator is obtained by using two memories for maximum digital peak value—position conversion, in which the digital peak values are input beforehand. As the detector of this embodiment, a detector having a circular section is used in the structure shown in embodiment 1.

The detector housing of which section is a circle is used, composed of the aluminum cylindrical tube of 30 mmφ in outside diameter, 28 mmφ in inside diameter, 2 mm in thickness, and 300 mm in length, and the reflecting plate made of aluminum of 26 mmφ in outside diameter and 240 mm in length is arranged in the inside center location. At the same position as the reflecting plate made of aluminum, the translucent type neutron scintillator of 26 mm in width and 240 mm in length described in embodiment 1 is arranged at an angle of 45 degrees from the neutrons which enter in parallel. Two photo multipliers which detect the fluorescence emitted when the neutron enters the scintillator are arranged on both sides of the detector housing. The photo multiplier 8135 made by Hamamatsu Photonics K.K. (Japan) of 24 mm in outside diameter and 60 mm in length in this embodiment. And, the voltage of 1100V was applied as an electrode bias.

When sampling and measuring the signals output from two photo multipliers in this embodiment, the signals are synthesized by a summing circuit after the neutron signals output from two photo multipliers are amplified by high-speed amplifiers. The synthesized signal is input to a pulse height discrimination circuit, and the trigger signal larger than the predetermined level is output. The FPGA (Field-Programmable Gate Array) circuit is used for the digital signal processing which will be described hereafter in this embodiment. The product HD64F30488VTE25V made by Altera Corporation (The United States) was used as FPGA. The op-amp AD8007 made by Analog Devices, Inc. (The United States) was used as the high-speed amplifier, in which the gain is set to twice. This trigger signal is made as a starting point, the pulse height of the neutron signals output from two photo multipliers is sampled and measured by operating the analog/digital converter (ADC) using the sampling frequency of 200 MHz. The product AD9626 made by Analog Devices, Inc. was used as analog/digital converter (ADC). The product AD9626 made by Analog Devices, Inc. was used as an analog/digital converter (ADC). The time series data converted from analog data to digital data is recorded in a memory of FPGA. Because the conversion number of bits of ADC is 11 bits, the electrode bias of the photo multiplier was set to 800V so that the neutron waveform signal emitted from translucent type neutron scintillator can be defined by 11 bits (2048). Moreover, the recording time to the memory was assumed to be 1 μs or less.

Maximum digital peak value A of a right photo multiplier and maximum digital peak value B of a left photo multiplier were obtained by reading data from time series data recorded after sampling the waveform signals output from two photo multipliers, and comparing sequentially the time series data.

Next, the incidence position of the neutron to the scintillator was obtained by using two memories for maximum digital peak value—position conversion to which data for conversion was input beforehand. When the right edge of the scintillator is made a starting point at the neutron incidence position, the neutron incidence position is assumed to be X, the length of the scintillator is assumed to be L, the position correction term is assumed to be C, and the position offset term is assumed to be D, Neutron incidence position X is obtained from two maximum digital peak value based on the following expression.

$$X=(L+C) \times A^{1/2}/(A^{1/2}+B^{1/2})-D$$

Because it is possible to derive the neutron incidence position during 100 ns or less by using the memory for maximum digital peak value-position conversion, This method can obtain the position information in a short time, comparing with the method of embodiment 5. Moreover, it is possible to improve the phenomenon that the frequency distribution at each position comes off from symmetry as the incidence position moves in the directions of both ends of the detector shown in FIG. 11 as is in the evaluation result of embodiment 5 by correcting the maximum digital peak value-position conversion input data.

<Embodiment 6>

Two-dimension neutron image detector according to embodiment 6 is explained with reference to FIG. 15. This neutron detector has the following structure. The translucent type neutron scintillator is arranged at right angles to the neutron which enters in parallel in the internal mirror finished detector housing. Two photo multipliers for the X-axis are arranged oppositely in a horizontal direction of the detection housing and two photo multipliers for the Y-axis are arranged oppositely in a vertical direction of the detection housing, whereby the incidence position in an X-axis direction and the incidence position in a Y-axis direction are obtained. In this embodiment, the incidence position of the neutron to the scintillator is obtained by using a memory for maximum digital peak value—position conversion.

Figure 15:
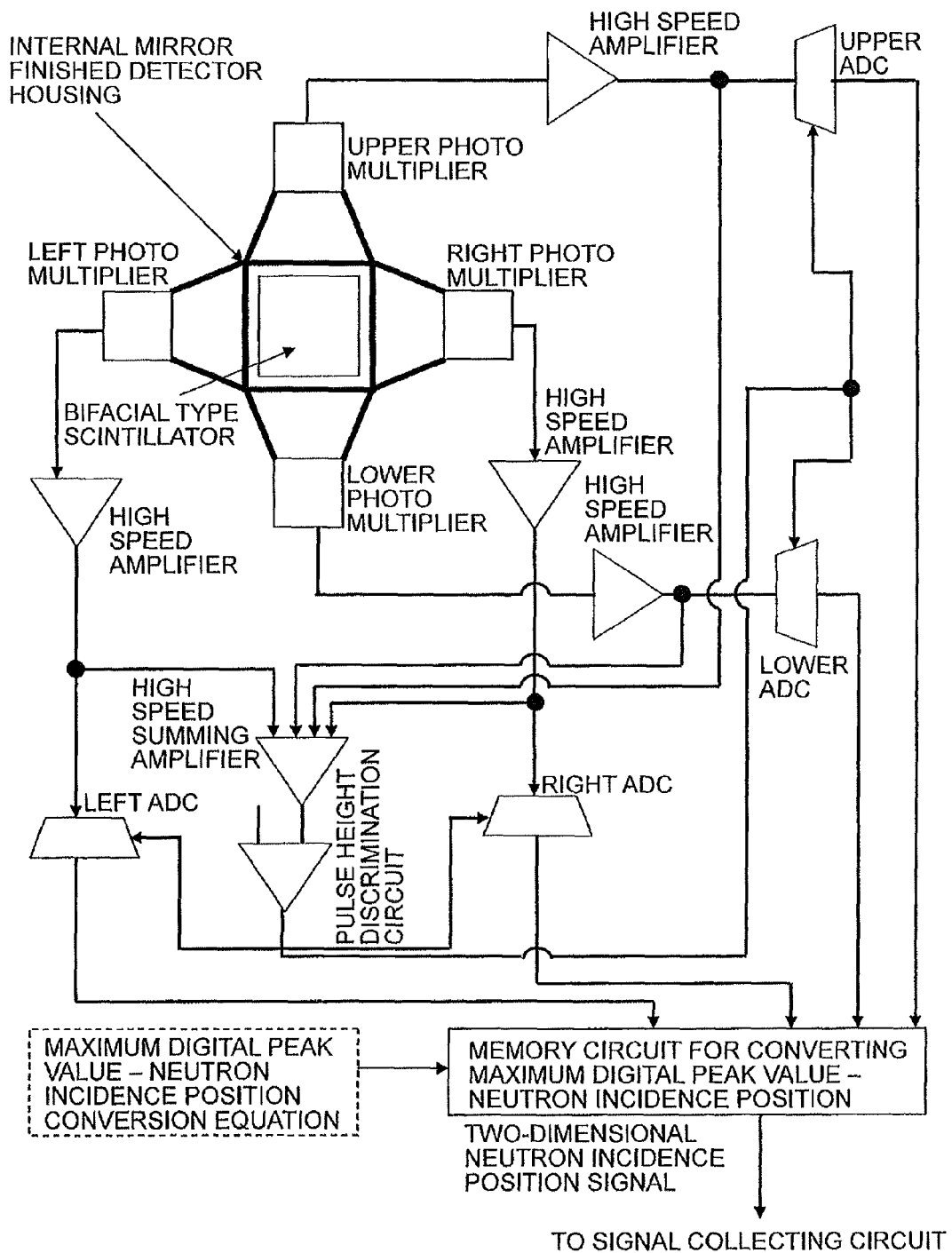
FIG. 15 is a block diagram showing a two-dimensional neutron image detector according to one embodiment of the present invention.

In the detector housing of this embodiment as shown in FIG. 15, the internal part is made of specular aluminum, the outside diameter of the neutron detection part is 120 mm×120 mm, the depth is 31 mm, and the thickness is 0.3 mm. Four guide plates are provided on four sides. The size of the guide plate is squeezed to the size of the photo multiplier at one end. The distance from the side to the photoelectric surface of the photo multiplier is assumed to be 4 cm. Moreover, the width of the internal surface in a direction of depth is 30.4 mm.

At the central part of the detection portion of the detector housing, translucent type neutron scintillator of 100 mm×100 mm described in embodiment 1 is arranged at an angle of 90 degrees from the neutrons which enter in parallel, that is, in parallel to the aluminum board of the detection portion. And, Two photo multipliers for the X-axis, that is, the right X-axis photo multiplier and the left X-axis photo multiplier are arranged oppositely in a horizontal direction of the detection housing and two photo multipliers for the Y-axis, that is, upper part Y-axis photo multiplier and lower side Y-axis photo multiplier are arranged oppositely in a vertical direction of the detection housing. The product R11265-100 made by Hamamatsu Photonics K.K. (Japan) of 30 mm×30 mm in outside diameter and 30 mm in length was used in this embodiment. And, the voltage of −800 V was applied as an electrode bias.

In this embodiment, the circuit structure used in embodiment 6 is adopted about the signal processing of the waveform signal output from two photo multipliers faced X-axis and Y-axis respectively.

By reading data from time series data recorded after sampling time series data, and comparing sequentially those data in connection with each of X-axis and Y-axis, Maximum digital peak value AX of the right X-axis photo multiplier, maximum digital peak value BX of the left X-axis photo multiplier, and maximum digital peak value BY of upper Y-axis photo multiplier, and maximum digital peak value AY of lower Y-axis photo multiplier are obtained respectively. Next, the neutron incidence positions in X-axis and Y-axis are obtained as two dimensional data by using two maximum digital peak value—position conversion memories each for X-axis and Y-axis in which conversion data each for X-axis and Y-axis is input beforehand.

With regard to the conversion data for X-axis, when the left edge of the scintillator is made a starting point at the neutron incidence position, the neutron incidence position is assumed to be X, the length of the faced scintillator is assumed to be LX, the position correction term is assumed to be CX, and the position offset term is assumed to be DX, Neutron incidence position X is obtained based on the following expression.

$$X=(LX+CX) \times AX^{1/2}/(AX^{1/2}+BX^{1/2})-DX$$

On the other hand, as to the conversion data for Y-axis, when the bottom of the scintillator is made a starting point at the neutron incidence position, the neutron incidence position is assumed to be Y, the length of the faced scintillator is assumed to be LY, the position correction term is assumed to be CY, and the position offset term is assumed to be DY, Neutron incidence position Y is obtained from two maximum digital peak value based on the following expression.

$$Y=(LY+CY) \times AY^{1/2}/(AY^{1/2}+BY^{1/2})-DY$$

Moreover, when the incidence position of the neutron to the scintillator is obtained by using the memory for maximum digital peak value—position conversion, the linearity of X-axis and Y-axis and the position resolutions can be improved by correcting maximum digital peak value—position conversion input data.

The obtained two-dimensional position information of eight bits for X-axis and Y-axis is converted into the LVDS standard signal, output as two parallel signals, and are multiplied by the signal collecting circuit as two-dimensional position information.

<Embodiment 7>

Figure 16:
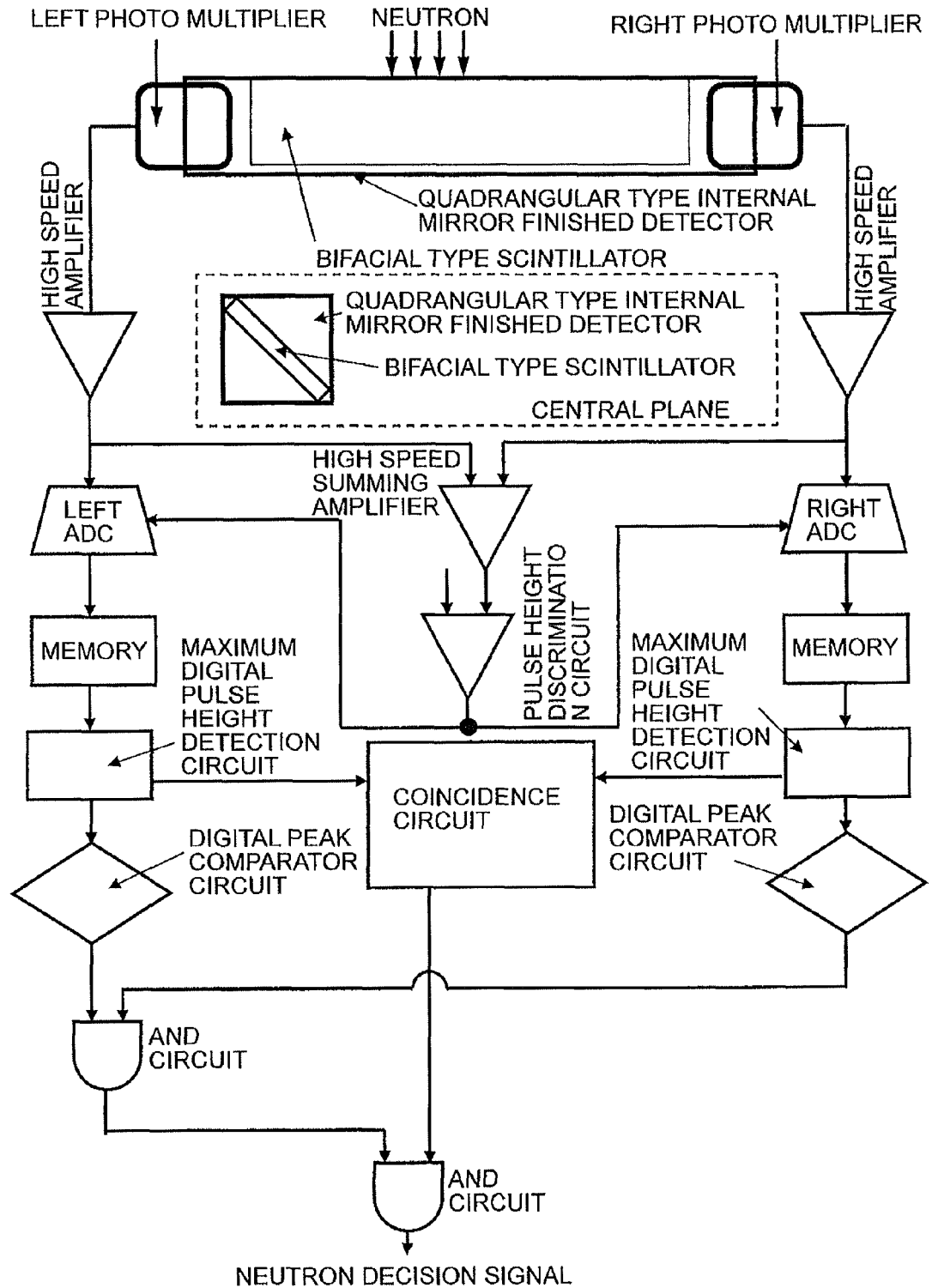
FIG. 16 is a block diagram showing a neutron detector according to a further embodiment of the present invention.

The neutron detector or the neutron image detector according to embodiment 7 is explained referring to FIG. 16. This neutron detector or the neutron image detector has the following structures. The fluorescence emitted when the neutron enters the scintillator is detected by two photo multipliers arranged on both sides. Next, each maximum digital peak value is obtained. And, the neutron signal is output based on the condition that both peak values are more than the predetermined digital pulse height threshold and the difference at the sampling collection time is within the coincidence measurement duration. The detector having a square section as shown in embodiment 1 is used in this embodiment.

The cross-sectional shape of the detector housing was assumed to be a square, the aluminum board of 0.8 mm in thickness is used for manufacturing, and inside diameter and length were assumed to be 30 mm×30 mm and 300 mm, respectively. Next, the reflecting plate made of aluminum of 30 mm×30 mm in outside diameter and 250 mm in length was arranged at the center location of the detector. The thickness of the reflecting plate is 0.3 mm. High reflectance aluminum sheet "MIRO" made by Material House Co., Ltd. was used as a substance of the reflecting plate made of aluminum. The total reflectivity of this aluminum sheet is 95% or more and the diffuse reflectance is less than 5%.

At the position of the reflecting plate made of aluminum inside the detector housing, the translucent type neutron scintillator described in embodiment 1 is arranged at an angle of 45 degrees from the neutrons which are incident in parallel all together.

Two photo multipliers which detect the fluorescence emitted when the neutron enters the scintillator are arranged on both sides of the detector housing. The product R11265-100 made by Hamamatsu Photonics K.K. (Japan) of 30 mm×30 mm in size and 30 mm in length was used in this embodiment.

In this embodiment, when coincidence-measuring the signals output from two photo multipliers at the predetermined duration, the signals are synthesized by a summing circuit after the neutron signals output from two photo multipliers are amplified by high-speed amplifiers. The synthesized signal is input to a pulse height discrimination circuit, and the trigger signal larger than the predetermined level is output. The FPGA (Field-Programmable Gate Array) circuit is used for the digital signal processing which will be described hereafter in this embodiment. The product HD64F30488VTE25V made by Altera Corporation (The United States) was used as FPGA. The op-amp AD8007 made by Analog Devices, Inc. (The United States) was used as the high-speed amplifier, in which the gain is set to twice. Now, this trigger signal is made as a starting point, the pulse height of the neutron signals output from two photo multipliers is sampled and measured by operating the analog/digital converter (ADC) using the sampling frequency of 200 MHz. The product AD9626 made by Analog Devices, Inc. was used as analog/digital converter (ADC). Time series data converted from analog data to digital data is recorded in a memory of FPGA. Because the conversion number of bits of ADC is 11 bits, the electrode bias of the photo multiplier was set to −800V so that the neutron waveform signal emitted from translucent type neutron scintillator can be defined by 11 bits (2048). Moreover, the recording time to the memory was assumed to be 1 μs or less.

As to the waveform signals output from two photo multipliers, the maximum digital peak value and the recording time from the trigger starting time were obtained by reading data from time series data recorded after sampling the waveform signals output from two photo multipliers, and comparing sequentially the time series data. That the obtained digital peak values of two photo multipliers are more than the predetermined digital threshold is confirmed by using an AND circuit, in which the predetermined digital threshold is 64. The influence of the noise such as circuit noises, etc. was able almost to be eliminated by adopting this predetermined threshold. Moreover, the neutron signal is confirmed based on the condition that the difference at the sampling collection time of maximum digital peak value of the signals output from two photo multipliers is in the predetermined coincidence measurement duration, and is output as a neutron confirmation signal from FPGA. The coincidence measurement time was assumed to be 300 ns in consideration of the short-lived component of ZnS:Ag, Cl fluorescent substance of 300 ns.

The detection efficiency of this detector was measured by using Am-Li radiation source of 7.4 GBq as a neutron source and making the thermal neutron with paraffin block of 5 cm in thickness. The comparative measurement was performed between the standard $^3$He proportional counter having the outside diameter of 1 inch and $^3$He of 4 atmospheric pressures and the detector of the present invention to obtain the relative detection efficiency.

The results of the counting rate measurement due to the standard $^3$He proportional counter was 272.5 cps while the results due to the detector of this embodiment was 285 cps. The relative detection efficiency of this detector was obtained by matching the neutron felt area to $^3$He proportional counter. As a result, it was able to be confirmed that the relative detection efficiency is 82.4%.

The relative detection efficiency is improved by about 12% compared with the relative detection efficiency of the detector according to embodiment 1. Because the neutron signal is reliably output by using a coincidence measurement method while observing the peak value by using the ADC according to the present invention, it may become possible to lower substantially the signal distinction levels, that is, the digital threshold of pulse height comparing with the conventional signal processing method.

<Embodiment 8>

Figure 17:
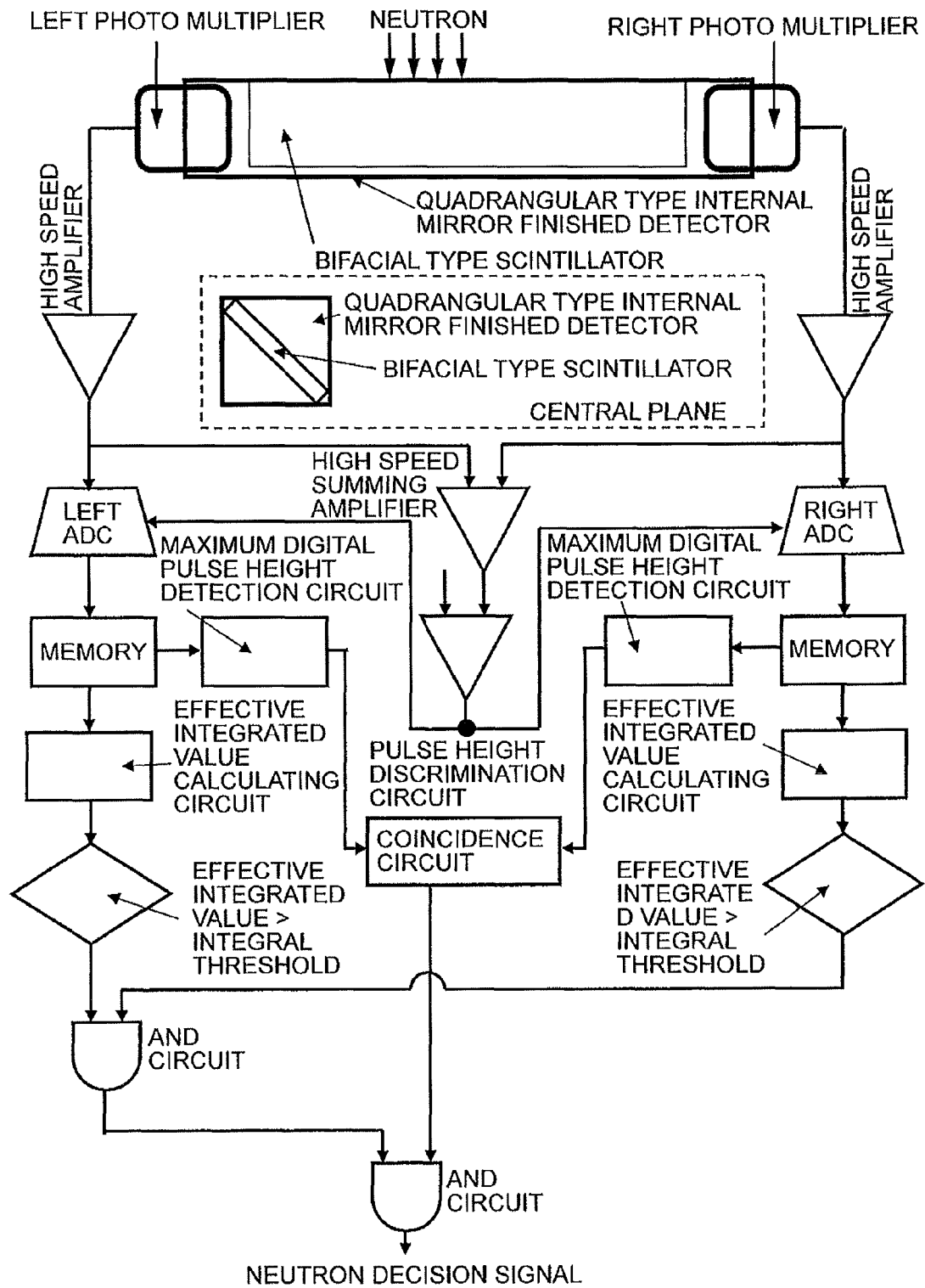
FIG. 17 is a block diagram showing a neutron detector according to a further embodiment of the present invention.

The neutron detector or the neutron image detector according to embodiment 8 is explained with reference to FIG. 17. This neutron detector or the neutron image detector has the following structures. The fluorescence emitted when the neutron enters the scintillator is detected by two photo multipliers arranged on both sides. The time series data during the predetermined multiplication time is obtained as an integrated value. And, the neutron signal is output based on the condition that both integrated values are more than the predetermined integral threshold and the difference at the sampling collection time is within the coincidence measurement duration. The detector having a square section as shown in embodiment 1 is used in this embodiment.

The cross-sectional shape of the detector housing was assumed to be a square, the aluminum board of 0.8 mm in thickness is used for manufacturing, and inside diameter and length were assumed to be 30 mm×30 mm and 300 mm, respectively. Next, the reflecting plate made of aluminum of 30 mm×30 mm in outside diameter and 250 mm in length was arranged at the center location of the detector. The thickness of the reflecting plate is 0.3 mm. High reflectance aluminum sheet "MIRO" made by Material House Co., Ltd. was used as a substance of the reflecting plate made of aluminum.
The total reflectivity of this aluminum sheet is 95% or more and the diffuse reflectance is less than 5%.

At the position of the reflecting plate made of aluminum inside the detector housing, the translucent type neutron scintillator described in embodiment 1 is arranged at an angle of 45 degrees from the neutrons which are incident in parallel all together.

Two photo multipliers which detect the fluorescence emitted when the neutron enters the scintillator are arranged on both sides of the detector housing. The product R11265-100 made by Hamamatsu Photonics K.K. (Japan) of 30 mm×30 mm in size and 30 mm in length was used in this embodiment. And, the voltage of 800V was applied as an electrode bias.

When sampling and measuring the signals output from two photo multipliers in this embodiment, the signals are synthesized by a summing circuit after the neutron signals output from two photo multipliers are amplified by high-speed amplifiers. The synthesized signal is input to a pulse height discrimination circuit, and the trigger signal larger than the predetermined level is output. The FPGA (Field-Programmable Gate Array) circuit is used for the digital signal processing which will be described hereafter in this embodiment. The product HD64F30488VTE25V made by Altera Corporation (The United States) was used as FPGA. The op-amp AD8007 made by Analog Devices, Inc. (The United States) was used as the high-speed amplifier, in which the gain is set to twice. This trigger signal is made as a starting point, the pulse height of the neutron signals output from two photo multipliers is sampled and measured by operating the analog/digital converter (ADC) using the sampling frequency of 200 MHz. AD9626 made by Analog Devices, Inc. is used as analog/digital converter (ADC). The time series data converted from analog data to digital data is recorded in a memory of FPGA. Because the conversion number of bits of ADC is 11 bits, the electrode bias of the photo multiplier was set to 800V so that the neutron waveform signal emitted from translucent type neutron scintillator can be defined by 11 bits (2048). Moreover, the recording time to the memory was assumed to be 1 μs or less.

The maximum digital peak value and the recording time from the trigger starting time were obtained by reading data from time series data recorded after the sampling-measurement of the time series data in connection with the waveform signals output from two photo multipliers, and comparing sequentially the time series data.

Next, the recorded time series data were integrated during 500 ns from the beginning, that is, 100 data was integrated. The integral values were divided by 5 bits (32) because they become large. Actually, the data was read by shifting 5 bits, and the effective integral value was obtained. The value at almost the same level as the maximum digital peak value obtained in embodiment 8 can be obtained as the average value of the waveform data by shifting 5 bits.

That the obtained effective integral values of two photo multipliers are more than the predetermined integral threshold is confirmed by using an AND circuit, in which the predetermined integral threshold is 64. The influence of the noise such as circuit noises, etc. was able almost to be eliminated by adopting this predetermined threshold. Moreover, the neutron signal is confirmed based on the condition that the difference at the sampling collection time of maximum digital peak value of the signals output from two photo multipliers is within the predetermined coincidence measurement duration, and is output as a neutron confirmation signal from FPGA. The coincidence measurement time was assumed to be 300 ns in consideration of the short-lived component of ZnS:Ag, Cl fluorescent substance being 300 ns.

The detection efficiency of this detector was measured by using Am-Li radiation source of 7.4 GBq as a neutron source and making the thermal neutron with paraffin block of 5 cm in thickness. The comparative measurement was performed between the standard $^3$He proportional counter having the outside diameter of 1 inch and $^3$He of 4 atmospheric pressures and the detector of the present invention to obtain the relative detection efficiency.

The counting rate measurement result of this detector was 285 cps while the counting rate measurement result of $^3$He proportional counter was 272.5 cps. The relative detection efficiency of this detector was obtained by matching the neutron felt area to the $^3$He proportional counter. As a result, it was able to be confirmed that the relative detection efficiency is 81.1%. In addition, it was able to confirm that it was efficiency of 73% to the standard $^3$He proportional counter of which $^3$He pressure is 4 atmospheric pressures. And, it was able to be confirmed to obtain almost the same relative detection efficiency as the embodiment 8.

<Embodiment 9>

Figure 18:
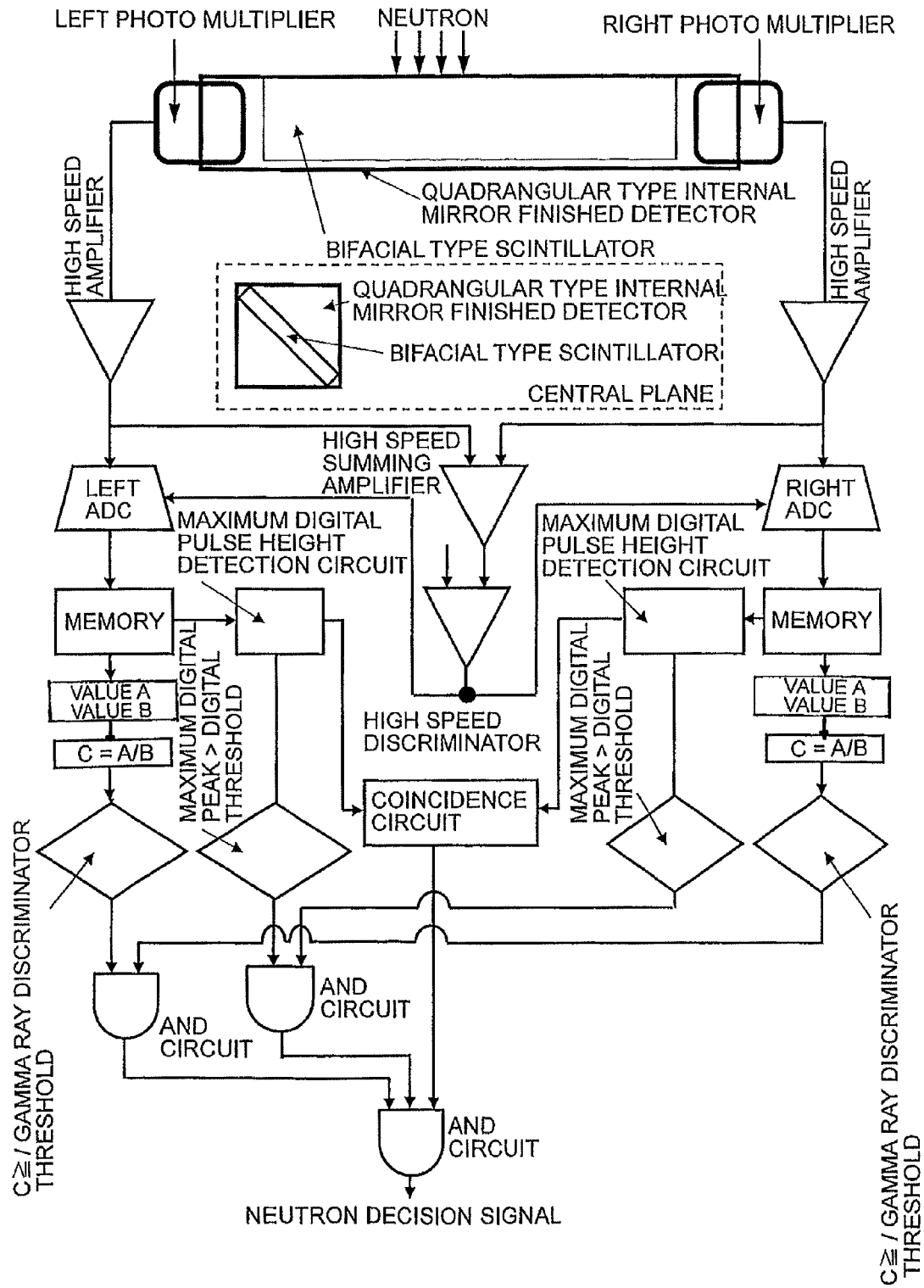
FIG. 18 is a block diagram showing a neutron detector according to a further embodiment of the present invention.

The neutron detector according to embodiment 9 is explained referring to FIG. 18. This neutron detector has the following structure. The neutron/gamma discrimination is performed by using the fact that the emission characteristics of the fluorescence detected by a translucent type plate neutron scintillator having the structure capable to emit the fluorescence from double-sides, composed of ZnS fluorescent substance which is the polycrystalline powder and a neutron converter which contains $^6$Li or $^{10}$B when the neutron is detected are different from those of the gamma rays which forms background. A detector having a square section is used in the structure shown in embodiment 1.

Figure 19:
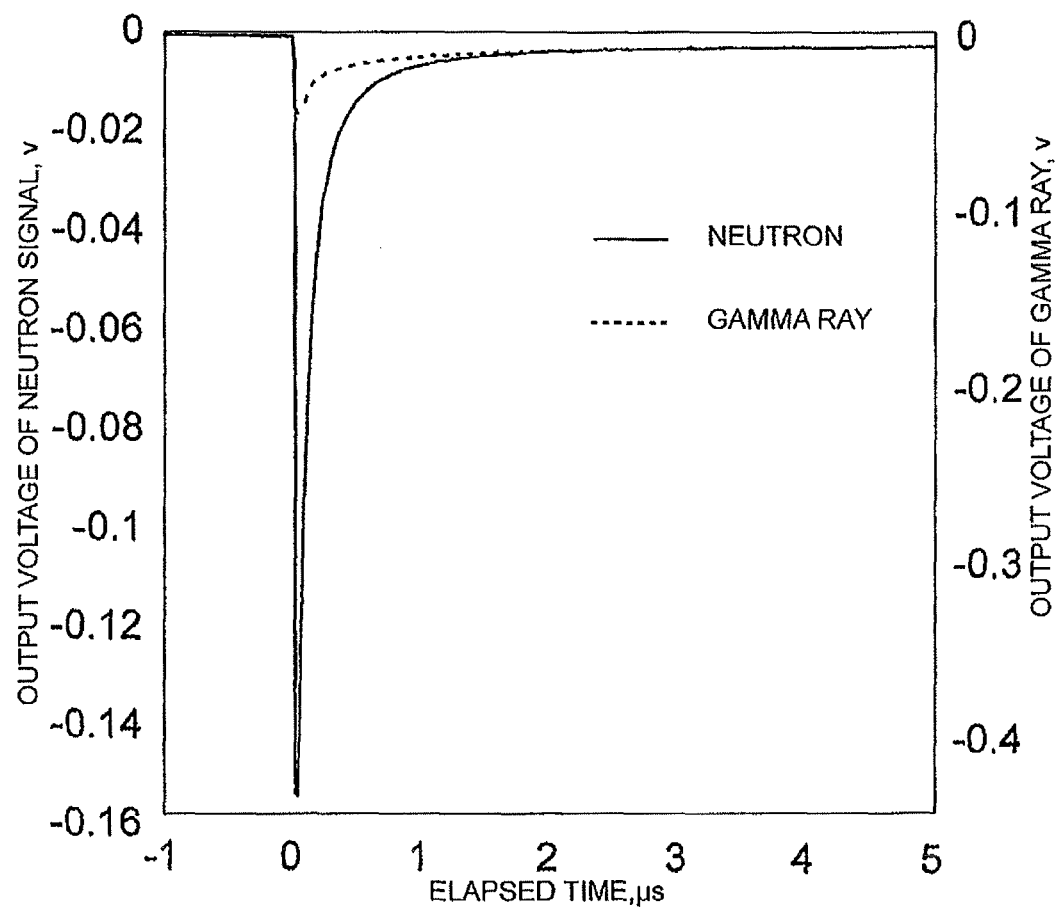
FIG. 19 is a graph showing the comparison between time series emission characteristics of fluorescence.

The time series emission characteristics of the fluorescence emitted when the neutron enters into translucent type neutron scintillator and the time series emission characteristics of the fluorescence when the gamma ray enters thereto are shown in FIG. 19.

The cross-sectional shape of the detector housing was assumed to be a square, the aluminum board of 0.8 mm in thickness is used for manufacturing, and inside diameter and length were assumed to be 30 mm×30 mm and 300 mm, respectively. Next, the reflecting plate made of aluminum of 30 mm×30 mm in outside diameter and 250 mm in length was arranged at the center location of the detector. The thickness of the reflecting plate is 0.3 mm. High reflectance aluminum sheet "MIRO" made by Material House Co., Ltd. was used as a substance of the reflecting plate made of aluminum. The total reflectivity of this aluminum sheet is 95% or more and the diffuse reflectance is less than 5%.

At the position of the reflecting plate made of aluminum inside the detector housing, the translucent type neutron scintillator described in embodiment 1 is arranged at an angle of 45 degrees from the neutrons which are incident in parallel all together.

Two photo multipliers which detect the fluorescence emitted when the neutron enters the scintillator are arranged on both sides of the detector housing. The product R11265-100 made by Hamamatsu Photonics K.K. (Japan) of 30 mm×30 mm in size and 30 mm in length was used in this embodiment.

When coincidence-measuring the signals output from two photo multipliers by using the predetermined duration in this embodiment, the signals are synthesized by a summing circuit after the neutron signals output from two photo multipliers are amplified by high-speed amplifiers. The synthesized signal is input to a pulse height discrimination circuit, and the trigger signal larger than the predetermined level is output. The FPGA (Field-Programmable Gate Array) circuit is used for the digital signal processing which will be described hereafter in this embodiment. The product HD64F30488VTE25V made by Altera Corporation (The United States) was used as FPGA. And, the op-amp made by Analog Devices, Inc. (The United States) was used as the high-speed amplifier, in which the gain is set to twice. This trigger signal is made as a starting point, the pulse height of the neutron signals output from two photo multipliers is sampled and measured by operating the analog/digital converter (ADC) using the sampling frequency of 200 MHz. The product AD9626 made by Analog Devices, Inc. is used as analog/digital converter (ADC). Time series data converted from analog data to digital data is recorded in a memory of FPGA. Because the conversion number of bits of ADC is 11 bits, the electrode bias of the photo multiplier was set to −800V so that the neutron waveform signal emitted from translucent type neutron scintillator can be defined by 11 bits (2048). Moreover, the recording time to the memory was assumed to be 1 μs or less.

500 ns part, that is, 100 data from the beginning of time series data recorded is integrated after the sampling-measurement of the time series data in connection with the waveform signals output from two photo multipliers, and the integral value is set as a first half integrated value A. Moreover, 100 data from 500 ns to 1000 ns of time series data recorded is integrated, and the integral value is set as a second half integrated value B. Afterwards, first half integrated value A is divided by second half integrated value B and its result is set as neutron/gamma discrimination value C. The neutron signal is taken out by adding the condition that this neutron/gamma discrimination value C is equal to or more than the predetermined gamma discrimination threshold D to the function of embodiment 8 or embodiment 9.

The evaluation test of a neutron/gamma discrimination function of this embodiment was carried out by using Am-Li radiation source of 7.4 GBq as a neutron source and making the thermal neutron with paraffin block of 5 cm in thickness.

Figure 20:
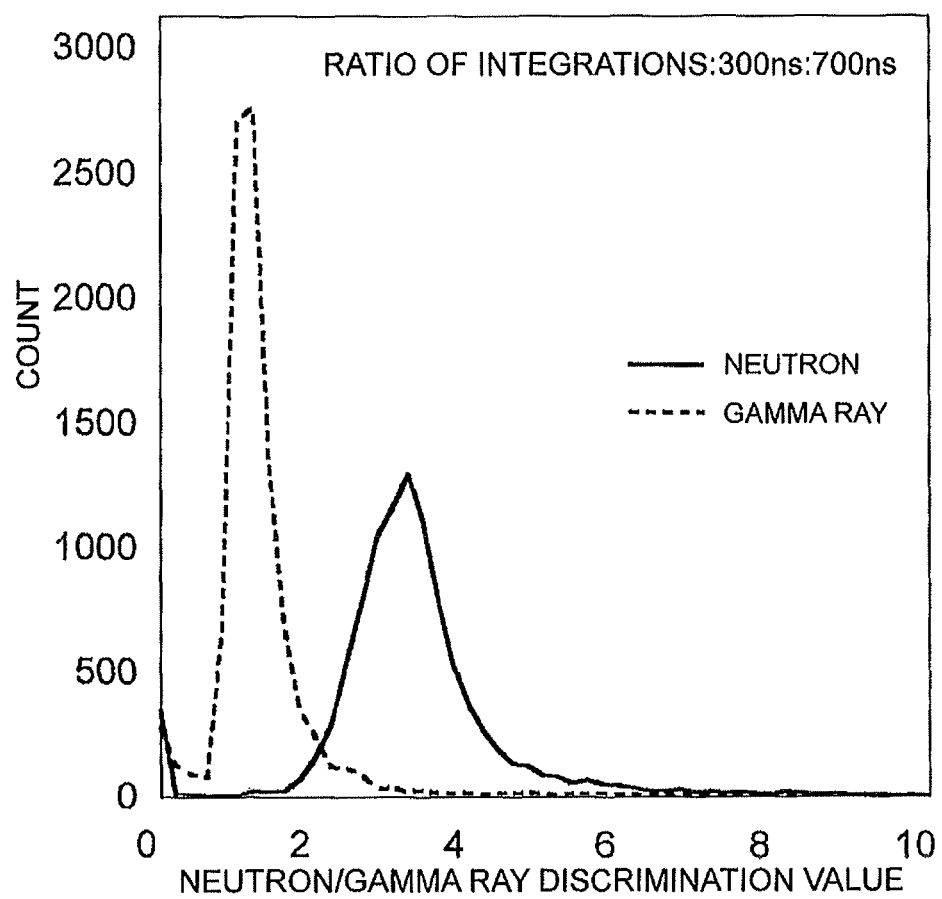
FIG. 20 is a graph showing the frequency distribution of neutron/gamma ray discrimination value.
Figure 21:
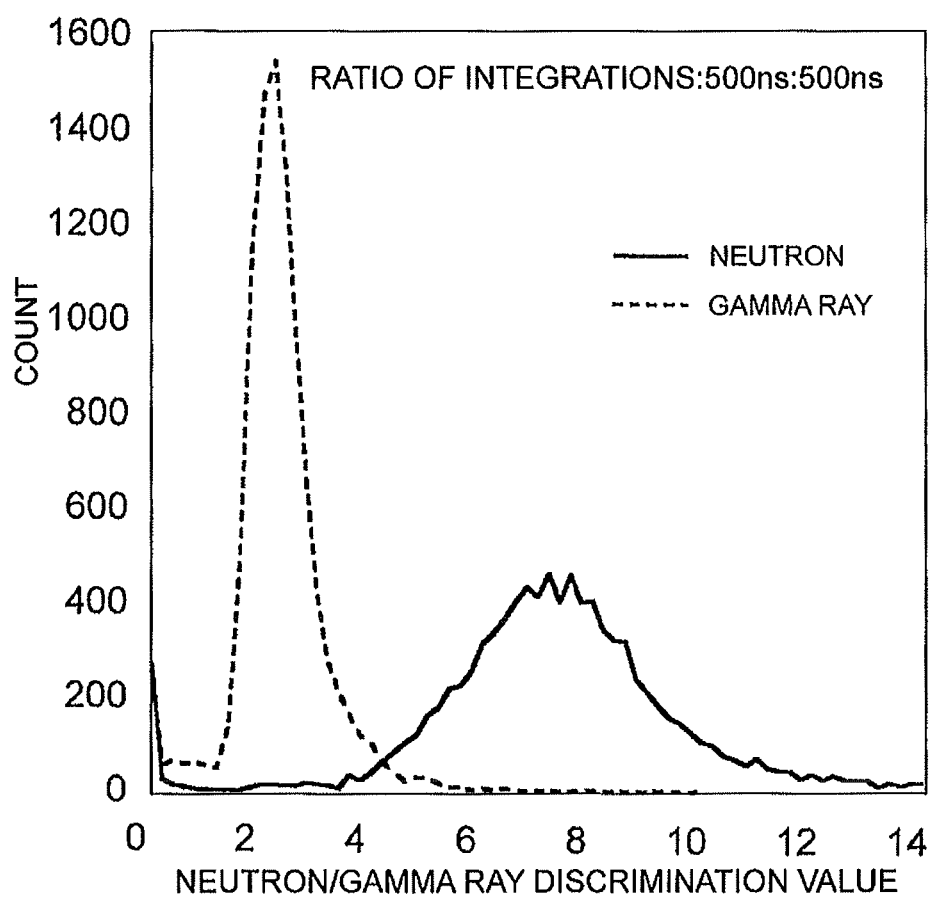
FIG. 21 is a graph showing the frequency distribution of neutron/gamma ray discrimination value.
Figure 22:
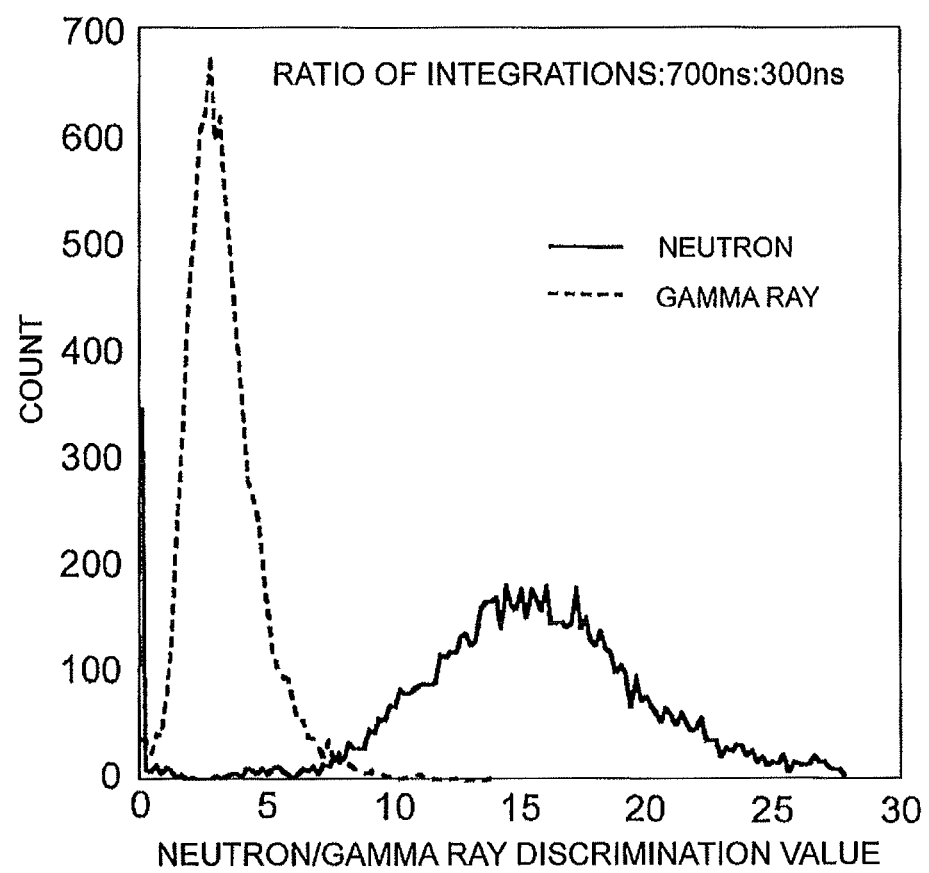
FIG. 22 is a graph showing the frequency distribution of neutron/gamma ray discrimination value.

The ratio of integral time of first half integrated value A and second half integrated value B between 1 μs was changed first to evaluate the neutron/gamma discrimination function, and measured. The measurement was performed in three kinds of ratios of the first half integral time:second half integral time, 300 ns:700 ns, 500 ns:500 ns and 700 ns:300 ns. The frequency distribution of neutron/gamma discrimination value C on 10,000 samples of neutron signal wave is shown in FIG. 20 to FIG. 22. Moreover, a similar measurement was performed by using $^{60}$Co radiation source for gamma rays, and neutron/gamma discrimination value C was obtained. The results are plotted in FIG. 20 to FIG. 22. As a result, the result in which 500 ns:500 ns is the best in neutron/gamma discrimination was obtained, although there were not so many differences from 300 ns:700 ns to 700 ns:300 ns. Moreover, neutron/gamma discrimination value C is set to 4.2 in this embodiment.

Figure 23:
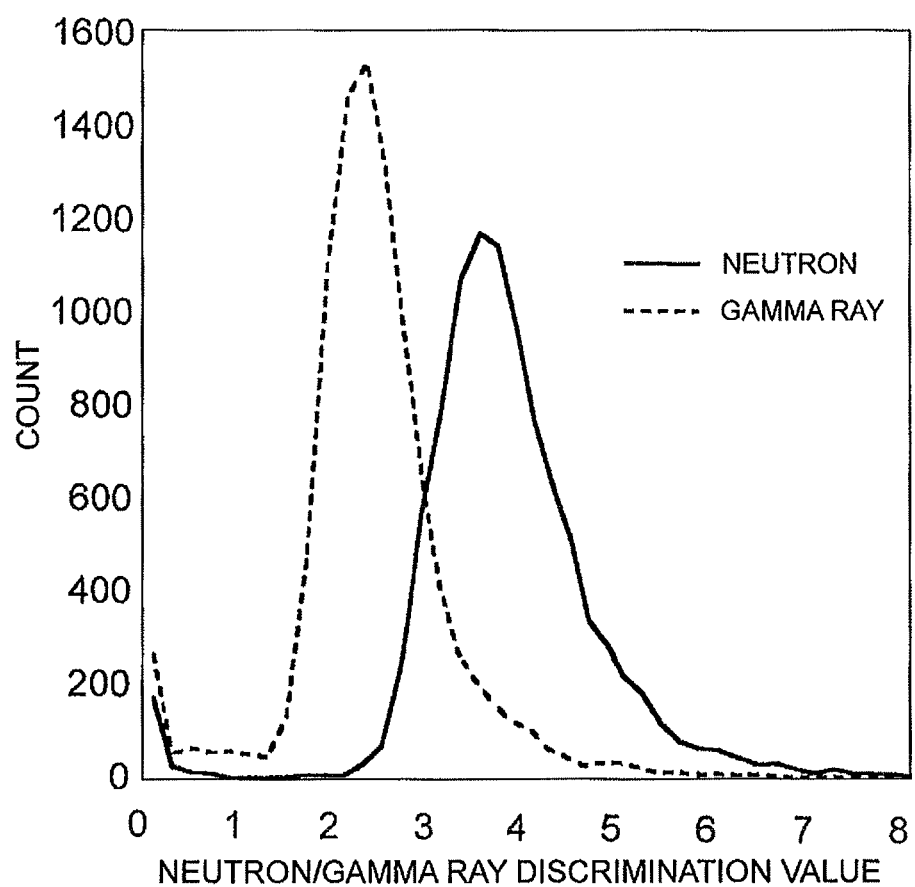
FIG. 23 is a graph showing the frequency distribution of neutron/gamma ray discrimination value.

Although a translucent type plate neutron scintillator having the structure capable to emit the fluorescence from double-sides, composed of ZnS fluorescent substance and a neutron converter which contains $^{10}$B was used in this embodiment, it was confirmed that the separation is considerably bad as shown in FIG. 23 when the ZnS/$^6$LiF translucent type neutron scintillator was used. Therefore, it is desirable to use the ZnS/$^{10}$B$_2$O$_3$ translucent type neutron scintillator to execute the present invention.

<Embodiment 10>

Figure 24:
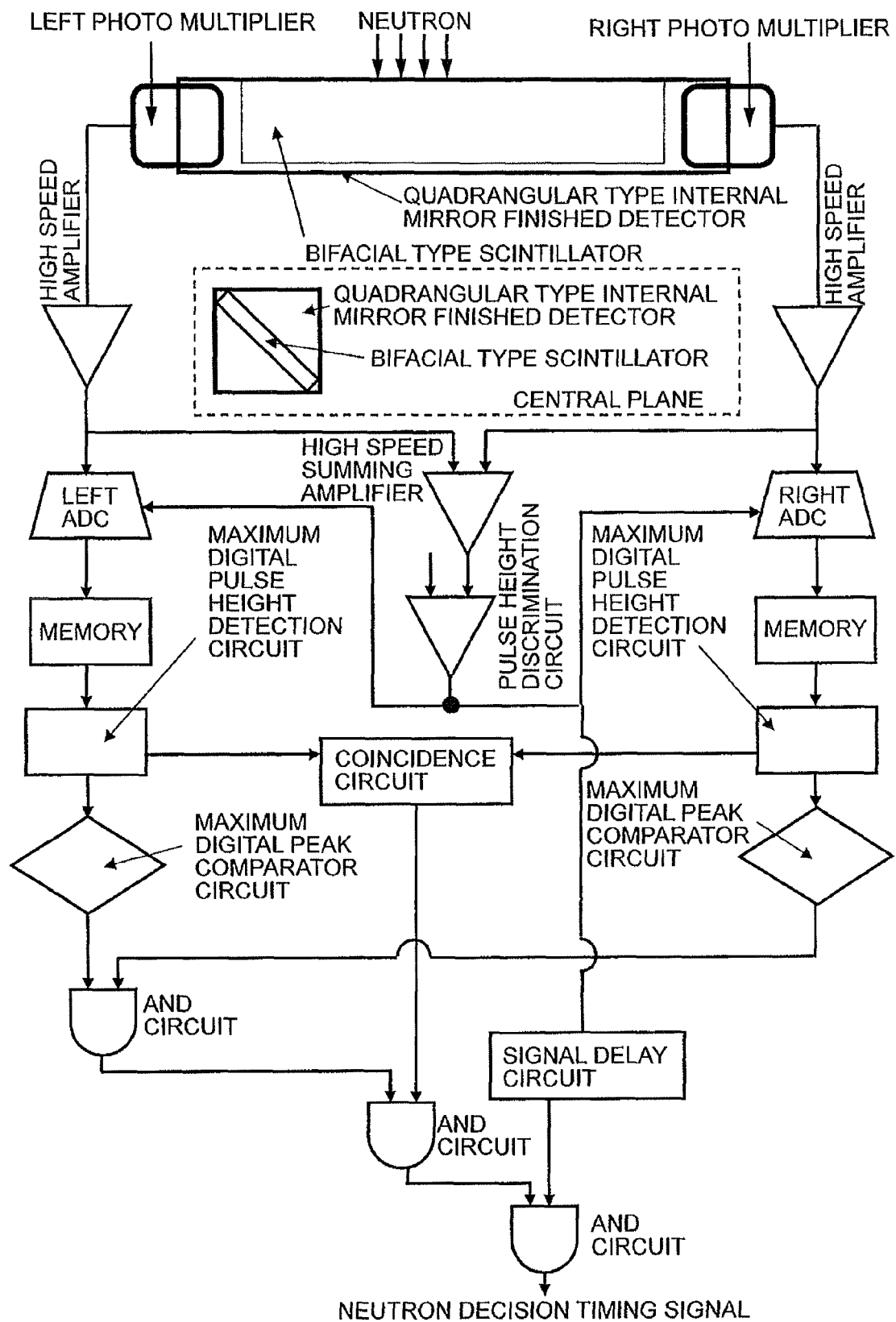
FIG. 24 is a block diagram showing a neutron detector according to a further embodiment of the present invention.

Next, the neutron detector or the neutron image detector according to embodiment 10 will be explained with reference to FIG. 24, in which a neutron incidence timing signal having constant delay time is output. Embodiment 8 is referred as an example of the detector.

The cross-sectional shape of the detector housing was assumed to be a square, the aluminum board of 0.8 mm in thickness is used for manufacturing, and inside diameter and length were assumed to be 30 mm×30 mm and 300 mm, respectively. Next, the reflecting plate made of aluminum of 30 mm×30 mm in outside diameter and 250 mm in length was arranged at the center location of the detector. The thickness of the reflecting plate is 0.3 mm. High reflectance aluminum sheet "MIRO" made by Material House Co., Ltd. was used as a substance of the reflecting plate made of aluminum. The total reflectivity of this aluminum sheet is 95% or more and the diffuse reflectance is less than 5%.

At the position of the reflecting plate made of aluminum inside the detector housing, the translucent type neutron scintillator described in embodiment 1 is arranged at an angle of 45 degrees from the neutrons which are incident in parallel all together.

Two photo multipliers which detect the fluorescence emitted when the neutron enters the scintillator are arranged on both sides of the detector housing. The product R11265-100 made by Hamamatsu Photonics K.K. (Japan) of 30 mm×30 mm in size and 30 mm in length in this embodiment. And, the voltage of −800 V was applied as an electrode bias.

When sampling and measuring the signals output from two photo multipliers in this embodiment, the signals are synthesized by a summing circuit after the neutron signals output from two photo multipliers are amplified by high-speed amplifiers. The synthesized signal is input to a pulse height discrimination circuit, and the trigger signal larger than the predetermined level is output.

The obtained trigger signal is made a starting point, the sampling measurement is performed, and the result is recorded. Then, the coincidence measurement processing, the neutron/gamma discrimination processing, and the neutron incidence position determining processing are executed based on the time series data recorded in the memory. And, the constant delay time more than the maximum processing time which will take by outputting as the neutron confirmation signal or the neutron incidence position signal is produced based on the clock of FPGA.

First of all, it takes the time of 1 μs as sampling-measurement time. Moreover, the distinction processing of neutron/gamma rays takes the longest signal processing time, and the multiplication of data and the last division process take the time of 1 μs. Therefore, the delay time is set to 2 μs in this embodiment.

In this embodiment, the internal clock of FPGA used for the digital processing uses 200 MHz to record the data ND-converted by using ADC of 200 MHz in an internal memory of FPGA.

Figure 25:
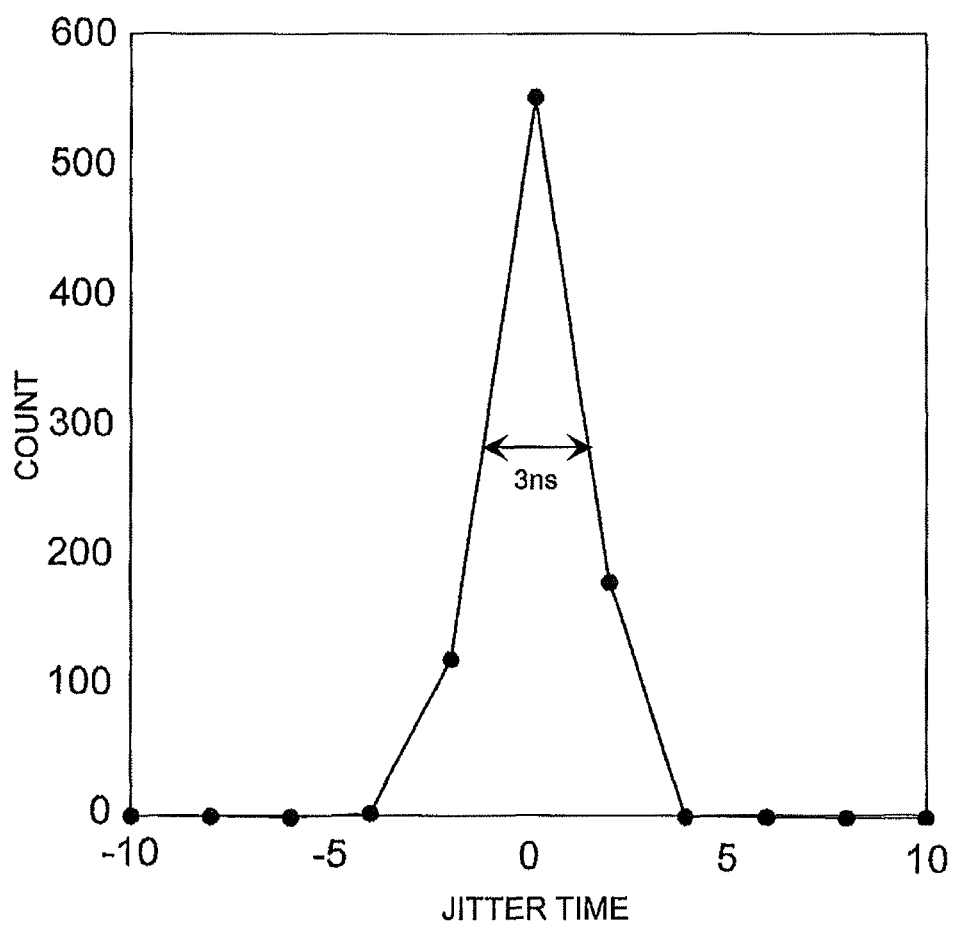
FIG. 25 is a graph showing the time jitter characteristics.

Therefore, the time accuracy of delay time becomes 5 ns. Moreover, because it has been confirmed that the time jitter when trigger signal is taken out is 5 ns or less as shown in FIG. 25 by the experiment by a high-speed oscilloscope which uses the same photo multiplier as this embodiment, the time accuracy of the neutron incidence time is 10 ns in all.

Any neutron signal is always delayed during this delay time 2 μs after the trigger signal, and the neutron incidence timing signal is output, which is a purpose of this embodiment. As a result, the jitter of timing signal caused by the variation of the signal processing time can be evaded.

<Embodiment 11>

Figure 26:
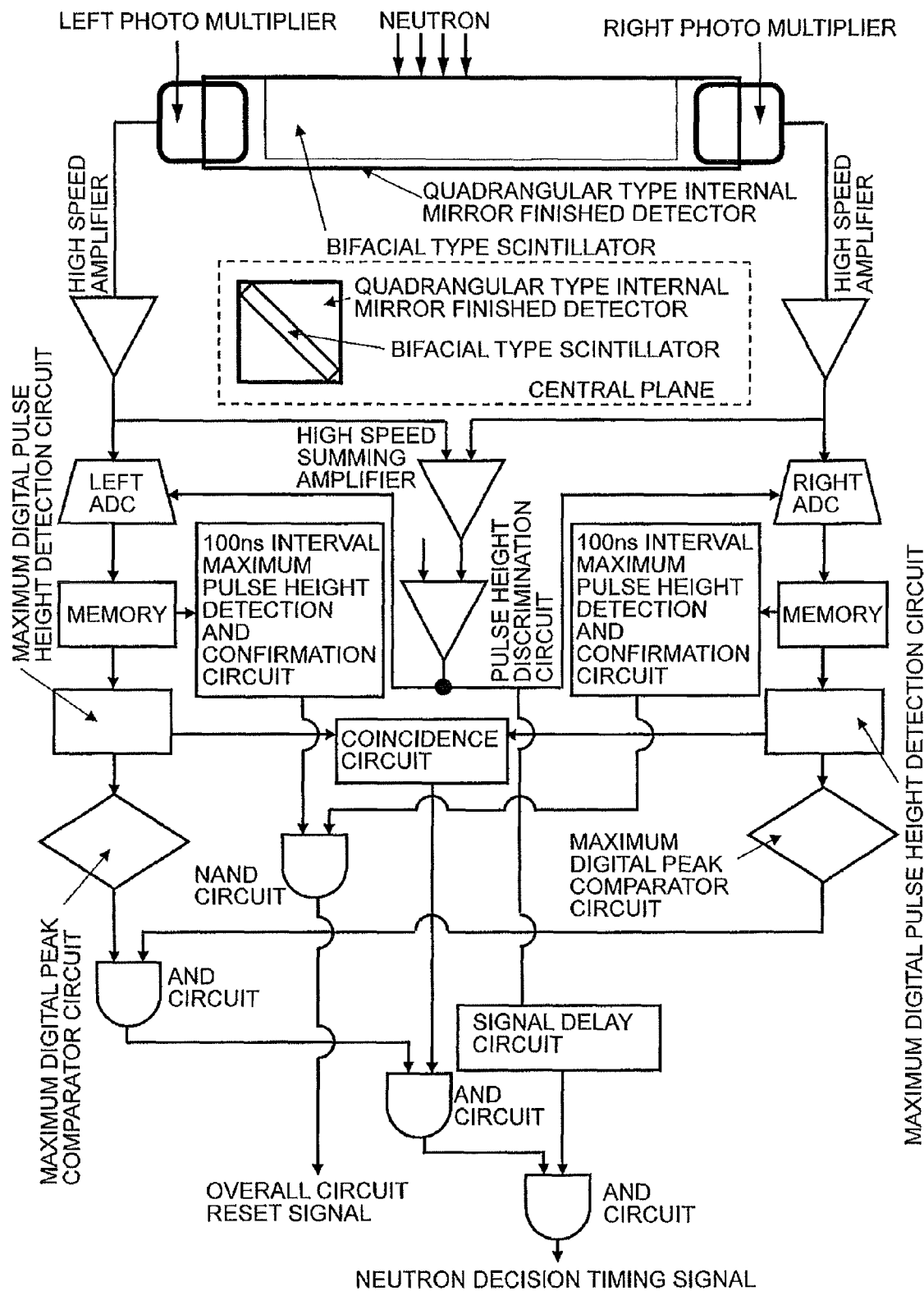
FIG. 26 is a block diagram showing a neutron detector according to a further embodiment of the present invention.

The neutron detector and the neutron image detector according to embodiment 11 are explained with reference to FIG. 26. This neutron detector and the neutron image detector have the following structures. In these detectors, the influence of the dead time due to the gamma ray incidence is reduced based on the fact that the waveform life time of the signal emitted by the reaction of the gamma ray entered and the photoelectric surface is 30 ns or less. The structure shown in embodiment 1 is used as a detector.

Figure 27:
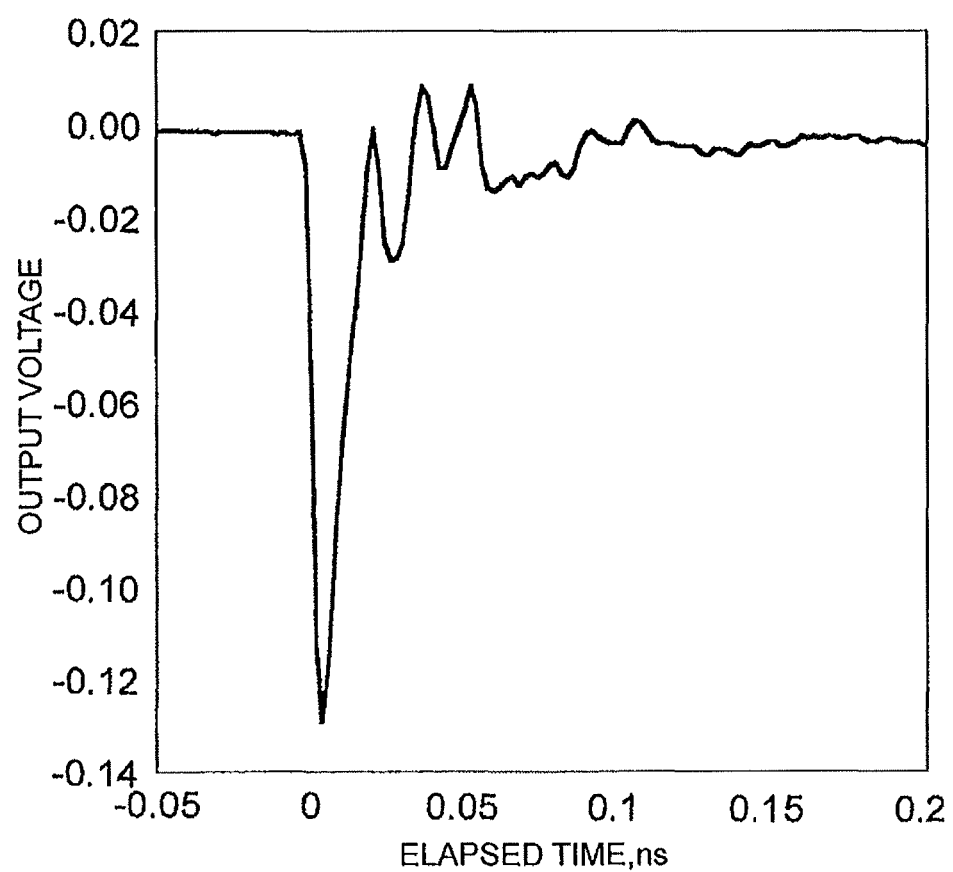
FIG. 27 is a graph showing the output voltage of the photo multiplier.
Figure 28:
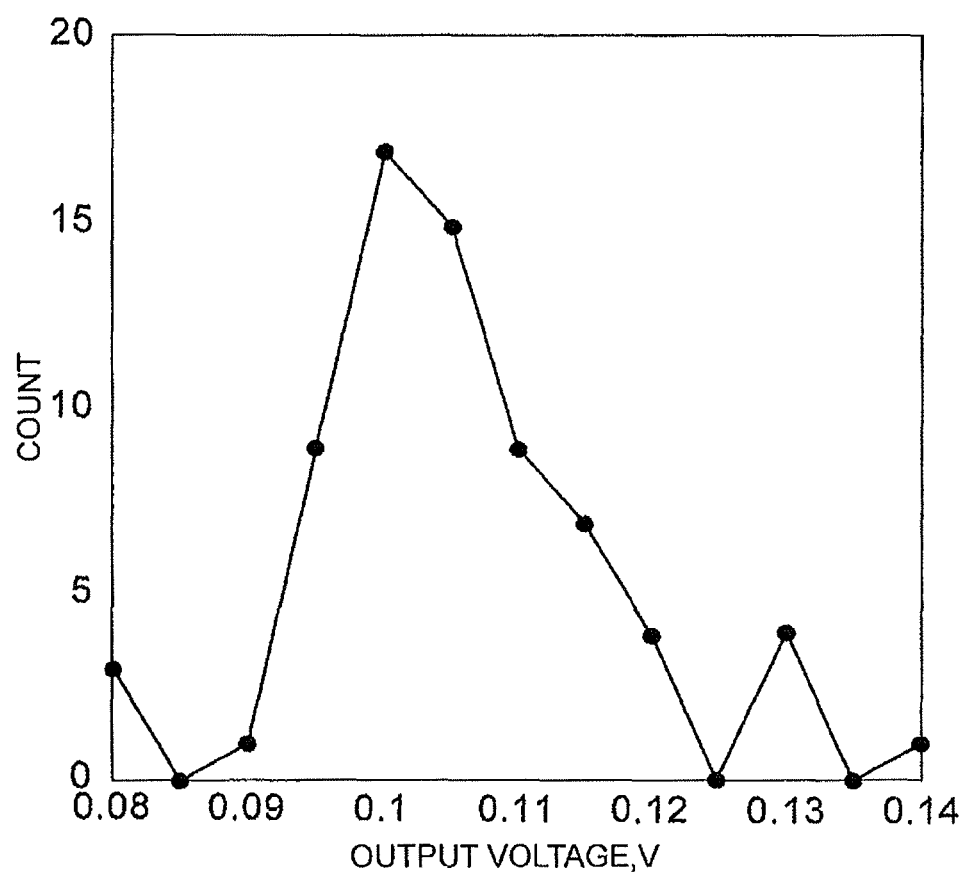
FIG. 28 is a graph showing the frequency distribution of output voltage of the photo multiplier.

The product R11265-100 made by Hamamatsu Photonics K.K. (Japan) was used as a photo multiplier. The voltage 800V was applied to this photo multiplier as an electrode bias, and $^{60}$Co of 1M Bq in strength was made to stick in the front side of the photo multiplier as a gamma source. When the gamma source was made to stick, the radiation monitor showed about 25 μSv as radiation dose. The output signal waveform is shown in FIG. 27. The half breadth of the signal is 15 ns and it is understood that they as many as 1/10 width are 30 ns and are extremely shorter. Moreover, the frequency distribution of the output voltage is shown in FIG. 28. It has been understood that the center of the output voltage is 0.1 V and an almost constant voltage is output thereat. The counting rate was about 0.01 cps because of 70 counts for the measurement of 2 hours.

This embodiment uses the fact that gamma rays rarely enter two photo multipliers at the same time to output signals. Moreover, this embodiment uses the fact that the characteristic is different from the time series emission characteristic of fluorescence from a translucent type plate neutron scintillator having the structure capable to emit the fluorescence from double-sides, composed of ZnS fluorescent substance which is the polycrystalline powder and a neutron converter which contains $^{6}$Li or $^{10}$B. The situation that the signal more than the predetermined threshold value of the photo multiplier incidence gamma ray enters during 30 ns after the record is started, and the signal more than the predetermined low limit value does not enter during 50 ns-100 ns after the record is started in connection with the recorded time series data 100 ns is determined as the gamma ray photoelectric surface signal. The influence of dead time due to the gamma rays incidence can be reduced by adding the circuit having functions to cancel the sampling measurement and wait for the neutron incidence after confirming that there is no signal more than the predetermined low limit value in time series data of the photo multiplier which reacted by the incidence of gamma rays and the photo multiplier on the other side, when this signal is detected.

What is claimed is:

1. A neutron detector, comprising:
a translucent type plate neutron scintillator having a structure configured to emit fluorescence from two sides, wherein
said neutron scintillator is composed of ZnS fluorescent substance and a neutron converter which contains $^{6}$Li or $^{10}$B, and arranged at an angle of 45 degrees from the neutrons which are incident in parallel, inside of a cylindrical detector housing with a circular or square section where a specular reflector with a reflectance of 90% or more is arranged internally, and
said fluorescence emitted when entry of the neutron into the scintillator is detected by two photo multipliers arranged on both sides of the detector housing, and signals output from the two photo multipliers are processed to be taken out as a neutron signal.

2. The neutron detector according to claim 1, wherein
said fluorescence reflected by the specular reflector is guided to a glass light guide with gamma ray shielding properties by arranging mirrors or prisms which have a reflection angle of 45 degrees from their center axis on both sides of the detector housing and the guided fluorescence is detected by the photo multiplier provided behind each light guide, and
the surrounding area of said neutron detector and the glass light guide arranged on both sides of said neutron detector is shielded with a gamma ray shielding member.

3. A one-dimensional neutron image detector which uses the neutron detector according to claim 1, wherein
when two neutron signals output from the two photo multipliers are coincidence-measured at a predetermined duration, the two neutron signals are synthesized by a summing circuit, the synthesized signal is input to a pulse height discrimination circuit, a trigger signal that is greater than a predetermined level is taken out, the pulse height of the neutron signals output from two photo multipliers making the trigger signal a starting point is sampled and measured using an analog/digital converter (ADC) having a sampling frequency of 100 MHz or more, a signal of the sampling frequency is digitalized, and recorded in a memory as time series data, after that, the maximum digital peak value of the recorded time series data is obtained, the maximum digital peak value of the right photo multiplier is set as A, and the maximum digital peak value of the left photo multiplier is set as B, when the right edge of the scintillator is made a starting point at the neutron incidence position, the neutron incidence position is assumed to be X, the length of the scintillator is assumed to be L, the position correction term is assumed to be C, and the position offset term is assumed to be D, neutron incidence position X is obtained from two maximum digital peak value based on the following expression:

$$X=(L+C)\times A^{1/2}/(A^{1/2}+B^{1/2})-D.$$

4. A one-dimensional neutron image detector which uses the neutron detector according to claim 1, wherein
when two neutron signals output from the two photo multipliers are coincidence-measured at a predetermined duration, the two neutron signals are synthesized using a summing circuit, the synthesized signal is input to a pulse height discrimination circuit, and a trigger signal greater than a predetermined level is taken out, the pulse height of the neutron signals output from the two photo multipliers making the trigger signal a starting point is sampled and measured using an analog/digital converter having a sampling frequency of 100 MHz or more, the signal sampled and measured is digitalized, and recorded in a memory as time series data, the maximum digital peak value of the recorded time series data is obtained, and the maximum digital peak value of the right photo multiplier is set as A and the maximum digital peak value of the left photo multiplier is set as B, the incidence position is input to the nonvolatile memory beforehand as a memory array of the maximum digital peak value of the left photo multiplier and the maximum digital peak value of the left photo multiplier, A and B obtained by the measurement are input to the memory array, and the right edge of said scintillator is made a starting point at the neutron incidence position, and neutron incidence position X is obtained.

5. A two-dimensional image detector, comprising:
a translucent type plate neutron scintillator having a structure configured to emit fluorescence from two sides, composed of a ZnS fluorescent substance which is a polycrystalline powder and a neutron converter which contains $^6$Li or $^{10}$B is arranged at right angles to the neutrons incident in parallel, inside a cylindrical detector housing of which an inner surface is mirror finished, two photo multipliers for the X-axis are arranged oppositely in a horizontal direction of the detection housing and two photo multipliers for the Y-axis are arranged oppositely in a vertical direction of the detection housing, wherein
the neutron incidence position in an X-axis direction and the neutron incidence position in a Y-axis direction are obtained using the neutron detector according to claim 4.

6. The neutron detector according to claim 1, wherein
when two neutron signals output from the two photo multipliers are coincidence-measured at a predetermined duration, the two neutron signals are synthesized using a summing circuit, the synthesized signal is input to a pulse height discrimination circuit, and a trigger signal that is greater than a predetermined level is taken out, and the pulse height of the two neutron signals output from the two photo multipliers making the trigger signal a starting point is sampled and measured using an analog/digital converter having a sampling frequency of 100 MHz or more, the signal sampled and measured is digitalized, and recorded in a memory as time series data, and the maximum digital peak value of the time series data recorded is obtained, and the neutron signal is output based on a condition that both peak values are more than a predetermined digital pulse height threshold and the difference at the sampling collection time is within the coincidence measurement duration.

7. The neutron detector according to claim 6, wherein
by using the fact that an emission characteristics of the fluorescence detected the translucent type plate neutron scintillator and the neutron converter are different from those of the gamma rays which form a background, the integral value integrated during a predetermined interval of time in connection with a first half of each time series data is set as a first half integrated value A, and the integral value in connection with a second half is set as a second half integrated value B based on the time series data in two memories in which the waveform signals of two photo multipliers are stored, and afterwards, the first half integrated value A is divided by the second half integrated value B and its result is set as neutron/gamma discrimination value C, and the neutron signal is taken out by adding the condition that the neutron/gamma discrimination value C is equal to or more than a predetermined gamma discrimination threshold D.

8. The neutron detector according to claim 6, wherein
the synthesized signal is input the pulse height discrimination circuit and the trigger signal that is greater than the predetermined level is output, the obtained trigger signal is made a starting point, the sampling measurement is performed, and the result is recorded, after that, the coincidence measurement processing, the neutron/gamma discrimination processing and the neutron incidence position determining processing are executed based on the time series data recorded in the memory, and a constant delay time that is greater than the maximum processing time which will take to output the neutron confirmation signal or the neutron incidence position signal is produced.

9. The neutron detector according to claim 6, wherein
a waveform life time of the signal emitted by the reaction of gamma rays that entered the scintillator and the photoelectric surface is 30 ns or less, and it is different from that of the time series emission characteristic of the fluorescence from the translucent type plate neutron scintillator and the neutron converter, and an effect caused by gamma rays incidence is reduced by adding the circuit having functions to cancel the sampling measurement and waiting for the neutron incidence when it is confirmed that the signal that is greater than the predetermined threshold value does not enter after a passage of 30 ns from the signal incidence based on the time series data recorded in the memory, and that a signal that is greater than a predetermined incidence gamma ray threshold does not enter during time series data 0 ns-50 ns recorded in the memory in connection with the opposing photo multiplier of the photo multiplier which reacted by the incidence of gamma rays.

10. The neutron detector according to claim 1, wherein
when two neutron signals output from the two photo multipliers are coincidence-measured at a predetermined duration, the two neutron signals are synthesized using a summing circuit, the synthesized signal is input to a pulse height discrimination circuit, and a trigger signal that is greater than a predetermined level is taken out, the pulse height of the two neutron signals output from the two photo multipliers making the trigger signal a starting point is sampled and measured using an analog/digital converter having a sampling frequency of 100 MHz or more, the signal sampled and measured is digitalized, and recorded in a memory as time series data, and after that, the time series data during integration time preset to 1 µs or less from the beginning of sampling is integrated based on the time series data recorded, and the neutron signal is output based on a condition that both integrated values are more than the predetermined integral threshold and the difference at the sampling collection time is within the coincidence measurement duration.

11. The neutron detector according to claim 10, wherein
by using the fact that an emission characteristics of the fluorescence detected by the translucent type plate neutron scintillator and the neutron converter are different from those of the gamma rays which form a background, the integral value integrated during a predetermined interval of time in connection with a first half of each time series data is set as a first half integrated value A, and the integral value in connection with a second half is set as a second half integrated value B based on the time series data in two memories in which the waveform signals of two photo multipliers are stored, and afterwards, the first half integrated value A is divided by the second half integrated value B and its result is set as neutron/gamma discrimination value C, and the neutron signal is taken out by adding the condition that the neutron/gamma discrimination value C is equal to or more than a predetermined gamma discrimination threshold D.

12. A neutron detector, comprising:
a translucent type plate neutron scintillators having a structure configured to emit fluorescence from two sides, wherein
said neutron scintillators composed of ZnS fluorescent substance which is a polycrystalline powder and a neutron converter which contains $^6$Li or $^{10}$B are arranged in a criss-cross structure, inside of a cylindrical detector housing with a circular or square section where a specular reflector with a reflectance of 90% or more is arranged internally,
one of said scintillators arranged in a criss-cross structure is arranged at an angle of 45 degrees from the neutrons which are incident in parallel, and the other is arranged at an angle of 135 degrees from the neutrons which are incident in parallel, and
said fluorescence emitted when the neutron enters the scintillator is detected by two photo multipliers arranged on both sides of the detector housing, and signals output from the two photo multipliers are processed to be taken out as a neutron signal.

13. The neutron detector according to claim 12, wherein
said fluorescence reflected by the specular reflector is guided to glass light guides with gamma ray shielding properties by arranging mirrors or prisms which have a reflection angle of 45 degrees from their center axis on both sides of the detector housing and the guided fluorescence is detected by the photo multiplier provided behind each glass light guide, and
the surrounding area of said neutron detector and the light guides arranged on both sides of said neutron detector is shielded with a gamma ray shielding member.

14. A two-dimensional image detector, comprising:
a translucent type plate neutron scintillator having a structure configured to emit fluorescence from two sides, composed of a ZnS fluorescent substance which is a polycrystalline powder and a neutron converter which contains $^6$Li or $^{10}$B is arranged at right angles to the neutrons incident in parallel, inside a cylindrical detector housing of which an inner surface is mirror finished, two photo multipliers for the X-axis are arranged oppositely in a horizontal direction of the detection housing and two photo multipliers for the Y-axis are arranged oppositely in a vertical direction of the detection housing, wherein
the neutron incidence position in an X-axis direction and the neutron incidence position in a Y-axis direction are obtained using the neutron detector according to claim 4.

15. A one-dimensional neutron image detector which uses the neutron detector according to claim 12, wherein
when two neutron signals output from the two photo multipliers are coincidence-measured at a predetermined duration, the two neutron signals are synthesized by a summing circuit, the synthesized signal is input to a pulse height discrimination circuit, a trigger signal that is greater than a predetermined level is taken out, the pulse height of the neutron signals output from the two photo multipliers making the trigger signal a starting point is sampled and measured using an analog/digital converter (ADC) having a sampling frequency of 100 MHz or more, the signal of the sampling frequency is digitalized, and recorded in a memory as time series data, after that, the maximum digital peak value of the recorded time series data is obtained, the maximum digital peak value of the right photo multiplier is set as A, and the maximum digital peak value of the left photo multiplier is set as B, when the right edge of the scintillator is made a starting point at the neutron incidence position, the neutron incidence position is assumed to be X, the length of the scintillator is assumed to be L, the position correction term is assumed to be C, and a position offset term is assumed to be D, neutron incidence position X is obtained from two maximum digital peak value based on the following expression:

$$X=(L+C)\times A^{1/2}/(A^{1/2}+B^{1/2})-D.$$

16. A one-dimensional neutron image detector which uses the neutron detector according to claim 12, wherein
when two neutron signals output from the two photo multipliers are coincidence-measured at a predetermined duration, the two neutron signals are synthesized by using a summing circuit, the synthesized signal is input to a pulse height discrimination circuit, and a trigger signal that is greater than a predetermined level is taken out,
the pulse height of the neutron signals output from the two photo multipliers making the trigger signal a starting point is sampled and measured using an analog/digital converter having a sampling frequency of 100 MHz or more, the signal sampled and measured is digitalized, and recorded in a memory as time series data, and
the maximum digital peak value of the recorded time series data is obtained, and the maximum digital peak value of the right photo multiplier is set as A and the maximum digital peak value of the left photo multiplier is set as B, the incidence position is input to the nonvolatile memory beforehand as a memory array of the maximum digital peak value of the left photo multiplier and the maximum digital peak value of the left photo multiplier, A and B obtained by the measurement are input to the memory array, and the right edge of said scintillator is made a starting point at the neutron incidence position, and neutron incidence position X is obtained.

17. The neutron detector according to claim 12, wherein
when two neutron signals output from the two photo multipliers are coincidence-measured at a predetermined duration, the two neutron signals are synthesized using a summing circuit, the synthesized signal is input to a pulse height discrimination circuit, and a trigger signal that is greater than a predetermined level is taken out, the pulse height of the two neutron signals output from the two photo multipliers making the trigger signal a starting point is sampled and measured using an analog/digital converter having a sampling frequency of 100 MHz or more, the signal sampled and measured is digitalized, and recorded in a memory as time series data, and the maximum digital peak value of the time series data recorded is obtained, and the neutron signal is output based on a condition that both peak values are more than the predetermined digital pulse height threshold and the difference at the sampling collection time is within the coincidence measurement duration.

18. The neutron detector according to claim 12, wherein when two neutron signals output from the two photo multipliers are coincidence-measured at a predetermined duration, the two neutron signals are synthesized using a summing circuit, the synthesized signal is input to a pulse height discrimination circuit, and a trigger signal that is greater than a predetermined level is taken out, the pulse height of the two neutron signals output from the two photo multipliers making the trigger signal a starting point is sampled and measured using an analog/digital converter having a sampling frequency of 100 MHz or more, the signal sampled and measured is digitalized, and recorded in a memory as time series data, and after that, the time series data during integration time preset to 1 μs or less from the beginning of sampling is integrated based on the time series data recorded, and the neutron signal is output based on a condition that both integrated values are more than the predetermined integral threshold and the difference at the sampling collection time is within the coincidence measurement duration.

* * * * *